United States Patent
Gruen et al.

(10) Patent No.: US 7,359,936 B2
(45) Date of Patent: Apr. 15, 2008

(54) METHOD AND APPARATUS FOR ELECTRONIC MAIL INTERACTION WITH GROUPED MESSAGE TYPES

(75) Inventors: Daniel M. Gruen, Newton, MA (US);
Paul B. Moody, Londonderry, NH (US); Bernard Kerr, Cambridge, MA (US); Steve L. Rohall, Winchester, MA (US); Seymour Kellerman, Cambridge, MA (US); John Patterson, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 10/351,862

(22) Filed: Jan. 27, 2003

(65) Prior Publication Data
US 2003/0167310 A1 Sep. 4, 2003

Related U.S. Application Data

(63) Continuation-in-part of application No. 09/995,151, filed on Nov. 27, 2001.

(60) Provisional application No. 60/352,364, filed on Jan. 28, 2002, provisional application No. 60/351,932, filed on Jan. 25, 2002.

(51) Int. Cl.
*G06F 15/173* (2006.01)

(52) U.S. Cl. .................................................. 709/203

(58) Field of Classification Search ................ 709/203, 709/202, 217
See application file for complete search history.

(56) References Cited

U.S. PATENT DOCUMENTS

| | | | | |
|---|---|---|---|---|
| 5,694,616 A | * | 12/1997 | Johnson et al. | 709/207 |
| 5,850,219 A | * | 12/1998 | Kumomura | 715/751 |
| 5,948,058 A | * | 9/1999 | Kudoh et al. | 709/206 |
| 6,088,696 A | * | 7/2000 | Moon et al. | 707/10 |
| 6,408,404 B1 | * | 6/2002 | Ladwig | 714/39 |
| 6,560,638 B1 | * | 5/2003 | Haneda et al. | 709/206 |
| 6,591,300 B1 | * | 7/2003 | Yurkovic | 709/226 |
| 6,732,157 B1 | * | 5/2004 | Gordon et al. | 709/206 |
| 6,925,605 B2 | * | 8/2005 | Bates et al. | 715/745 |
| 7,051,277 B2 | * | 5/2006 | Kephart et al. | 715/530 |
| 7,158,997 B2 | * | 1/2007 | Blinn et al. | 707/104.1 |
| 7,178,099 B2 | * | 2/2007 | Meyer et al. | 715/513 |

* cited by examiner

*Primary Examiner*—David Y. Eng
(74) *Attorney, Agent, or Firm*—David A. Dagg

(57) ABSTRACT

An electronic mail inbox uses a mail agent to categorize incoming electronic mail to facilitate more flexible and rapid viewing and possible response thereto. Several special functions for collection of regularly sent types of mail, such as newsletters, office memos, press releases, etc., are utilized. In addition, special menu items are provided for collection and presentation of different priority items, such as urgent correspondence and approval requests. The electronic mail inbox facilitates multiple viewing options so that collections of regularly sent or different priority types of mail may be viewed separately and/or interleaved with other items in a main mail inbox. In addition, items that require an affirmative response, such as approval requests, may include a special preview format that allows for rapid viewing of pertinent details and approval directly from the mail inbox without review of the complete item.

15 Claims, 34 Drawing Sheets

| all documents | | | _ □ X |
|---|---|---|---|
| CHECK MAIL / NEW / CHAT / /REPLY/ FORWARD/ PRINT/ DELETE / | | | |
| DATE | NAME | SUBJECT | |
| | ROBERT CORELL | interesting in a talk by Informio | ▲ |
| Wed 2 JUN | | | |
| 7:00 am | Blair Hankins | RECEIVED: UCD 4 IPD & GEM | 🗋 |
| | Irene Greif | Monthly Management Report: June Highlights Due 27 June 2001 | |
| | Irene Greif | Researchers: Quick exercise in reviewing June accomplishments | 🗋 |
| 8:00 | CNEY News.com | Microsoft's XP: Hardware changes a turnoff | |
| 9:00 | Robert Corell | Re: stories and olln | |
| | Sherra Kerns | IBM EPP has gone bonanzas... Act now to take advantage of this | |
| 11:00 | US EPP | extraordinary offer! | |
| | Blair Hankins | UCD 4 IPD & Gem | 🗋 |
| | Mike Danny | Re: are you interested in a talk by Informio (local company | |
| | Robert Corell | integrated voice with Notes email)? | |
| | David R Millen | OK, I'm still open after the mgrs meeting <eom> Re: Just | |
| | Li-Te Cheng | remembered - have to drop my | |
| | dance-and-dj-music- | Reminder from Maida- Managers meeting tomorrow (Thursday | |
| | editor | 10:00 in video conf room). Agenda and action items to follow (eom) | |
| | The Industry Standard | Sametime Relay Server - minor change | ▲ |
| | Maida Eisenberg | Amazon.com Delivers Dance & DJ Music | |
| | Li-Te Cheng | DAILY NEWS: Fed Cuts Rates a Quarter Point | ▼ |
| | Sherra E. Kerns | Interested in a talk by Informio | |
| | Irene Greif | Researchers: Quick exercise in reviewing June accomplishments | |
| | Jennifer Hassell | Sametime Relay Server 1.0 | |
| | Paul Moody | I'm for Tue July 10th - after 10am - not 1-2pm <eom> Re: are Re: I'm | |
| | Daniel Gruen | for Tue July 10th - after 10am - not 1-2pm <eom> you interested in | |
| | Robert Corell | a talk by Informio (local company integrating voice with Notes | |
| | Sherra E. Kerns | email)? | |
| | Igor L. Belakovskiy | RE: are you interested in a talk by Informio | |
| | Informio talk | | |
| | Maida Eisenberg | (local company integrating voice | |
| 9:00 | Amazon.com | with Notes email)? | |
| | Sophia Yuditskaya | I'm for Tue July 10th - after 10am - not 1-2pm <eom> | |
| | Igor l Belakovskiy | Re: are you interested in a talk by Informio (local company | |

Figure 8A

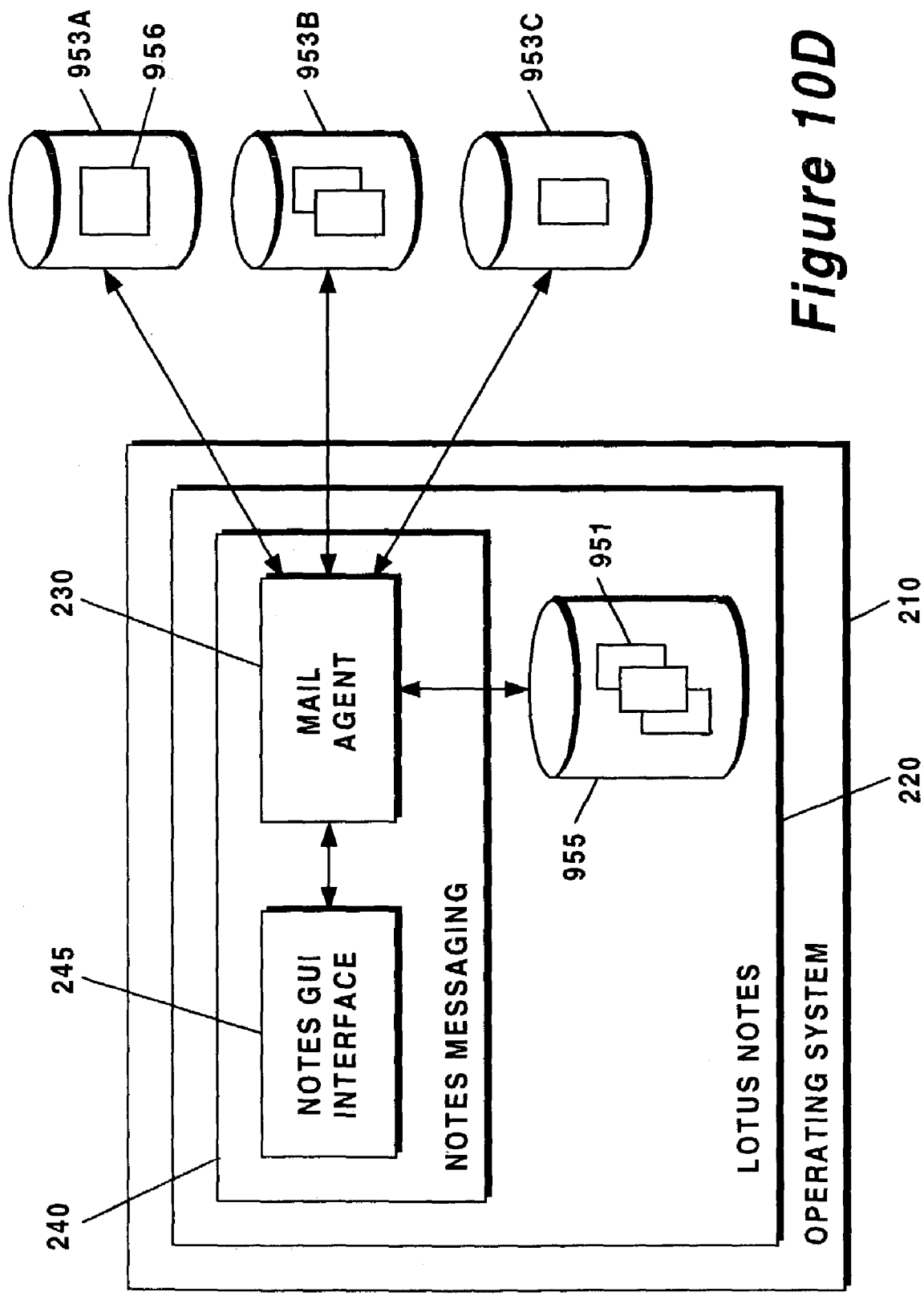

*Figure 12*

METHOD AND APPARATUS FOR ELECTRONIC MAIL INTERACTION WITH GROUPED MESSAGE TYPES

RELATED APPLICATIONS

This application claims priority to commonly assigned U.S. applications:

Ser. No. 09/995,151, filed Nov. 27, 2001, by Rohall et al., and entitled "METHOD AND APPARATUS FOR MAINTAINING CONVERSATION THREADS IN ELECTRONIC MAIL" of which this application is also a continuation in part;

Ser. No. 60/351,932, filed Jan. 25, 2002, by Moody et al., and entitled "METHOD AND APPARATUS FOR SUMMARIZATION OF THREADS IN ELECTRONIC MAIL"; and Ser. No. 60/352,364, filed Jan. 28, 2002, by Moody et al., and entitled "METHOD AND APPARATUS FOR ELECTRONIC MAIL INTERACTION."

In addition, this application is one of two related applications filed on an even date herewith and commonly assigned, both of which are continuation in part applications of commonly assigned U.S. application Ser. No. 09/995,151, and including the following:

U.S. patent application Ser. No. 10/351,776, entitled "Method and Apparatus for Interaction with Electronic Mail from Multiple Sources" by Moody et al., the subject matter of which is incorporated herein by reference for all purposes.

FIELD OF THE INVENTION

This invention relates, generally, to data processing systems and, more specifically, to a technique for effectively reviewing and processing electronic mail and electronic mail threads.

BACKGROUND OF THE INVENTION

Electronic mail has become one of the most widely used business productivity application. However, people increasingly feel frustrated by their electronic mail. They are overwhelmed by the volume, lose important items, and feel pressure to respond quickly. Though email usage has changed, electronic mail clients have changed little since they were first invented. Although current electronic mail clients are more graphical with onscreen buttons, pull-down menus and rich-text display, they are essentially derivative programs of the electronic mail clients from thirty years ago. Most electronic mail clients today have the same set of features and organizational structures: multiple folders in which messages can be filed, a textual listing of the messages within a given folder, and the ability to preview a selected message. However, studies have shown that folder systems quickly degrade with the number of messages people receive. Many people end up keeping all of their electronic mail in one large folder. The content and use of electronic mail has also changed. In addition to traditional letters, electronic mail now consists of invitations, receipts, transactions, discussions, conversations, tasks, and newsletters, to name a few variations.

A problem facing people in organizations is persistence. Too often projects get started only to lose momentum because of the effort required to track actions, activity and progress. The large volume of electronic mail with which most people must cope in conjunction with the inefficient electronic mail tools currently available exacerbates this problem. Many electronic mail users spend many unproductive hours sorting, prioritizing, and responding to electronic mail. This time depletes the time spent performing productive work. In addition, many current electronic mail applications do not interact with other productivity tools of the user, such as calendar programs and collaborative meeting applications. Accordingly, the user must repeatedly shift focus among different applications, possibly using his or her concentration on the current item. Also, with a large number of unread electronic mail items it is often difficult and time consuming to find items that are urgent, of interest or require an affirmative response.

Accordingly a need exists for electronic mail tools which facilitate greater efficiency in viewing, processing and responding to electronic mail.

A further need exists for an electronic mail viewer or inbox that enables users to preview electronic mail, organize types of mail, quickly respond to certain types of mail, and view complete conversation threads associated with electronic mail correspondence.

A further need exists for the ability to categorize incoming electronic mail items and to dynamically change the visual representation categorization as desired by the viewer.

SUMMARY OF THE INVENTION

The present invention contemplates an improved inbox or viewer for electronic mail that allows for greater integration of functions to enhance usability and productivity. The inventive electronic mail inbox of the present invention is based on the principles of: 1) bringing all communications together into one place; 2) helping to focus on what's important; 3) finding the information and people needed for a task or activity; and 4) keeping things moving forward over time.

The present invention contemplates an innovative and novel electronic mail inbox that uses a mail agent to categorize incoming electronic mail to facilitate more flexible and rapid viewing and possible response thereto. Several special functions for collection of regularly sent types of mail, such as newsletters, office memos, press releases, etc., are utilized. In addition, special menu items are provided for collection and presentation of different priority items, such as urgent correspondence and approval requests. The electronic mail inbox facilitates multiple viewing options so that collections of regularly sent or different priority types of mail may be viewed separately and/or interleaved with other items in the a main mail inbox. In addition, items that require an affirmative response, such as approval requests, may include a special preview format that allows for rapid viewing of pertinent details and approval directly from the from the mail inbox without review of the complete item.

According to another embodiment of the present invention, an improved inbox is capable of receiving not only electronic messages but tracking data and documents from other sources such as databases, templates and other information, without actually including such information in the inbox. Using either the shadow document generation or document summarization techniques a surrogate document, including any of the size, date, heading information, or summary data and a pointer to the original document data, is generated and placed in inbox. Upon selection of the surrogate document, the pointer is resolved, the complete content retrieved and stored locally and displayed in the electronic mail inbox.

According to one aspect of the invention, in a computer system operatively connectable to a network and capable of executing a communication process for sending and receiving electronic mail documents, a method comprises: (A) defining a plurality of categories of electronic mail documents; (B) determining if a received electronic mail document is associated with one of the plurality of categories of electronic mail documents; (C) receiving selection criteria as to which of the plurality of categories of electronic mail documents are to be displayed; and (D) displaying received electronic mail documents associated with less than all of the plurality of categories in accordance with the selection criteria. In one embodiment the method further comprises presenting a graphic representation of the category associated with the first memory. In another embodiment, method further comprises displaying the received electronic mail document or a surrogate document derived from the received electronic mail document upon selection thereof. In another embodiments, each of the electronic mail documents associated with one of the plurality of categories comprises a requests for an affirmative response by a recipient thereof and the categories may be selected from the group consisting of approvals, urgent mail, newsletters, memos, and press releases.

According to a second aspect of the invention, a computer program product for use with a computer system operatively connectable to a network and capable of executing a communication process for sending and receiving electronic mail documents, comprises: (A) program code for defining a plurality of categories of electronic mail documents; (B) program code for determining with which of the plurality of categories a received electronic mail document is associated; and (C) program code for displaying received electronic mail documents associated with a first of the plurality of categories in a first window region on a user interface while simultaneously displaying received electronic mail documents associated with a second of the plurality of categories in a second window region on the user interface.

According to a third aspect of the invention, a computer data signal for use with a computer system operatively connectable to a network and capable of executing a communication process for sending and receiving electronic mail documents, the computer data signal comprises: (A) program code for defining a plurality of categories of electronic mail documents; (B) program code for determining with which of the plurality of categories a received electronic mail document is associated; and (C) program code for displaying received electronic mail documents associated with a first one of the plurality of categories while simultaneously displaying a graphic representation of a second category of the plurality of categories.

According to a fourth aspect of the invention, an apparatus for use with a computer system operatively connectable to a network and capable of executing a communication process for sending and receiving electronic mail documents, comprises: (A) program logic for defining a plurality of categories of electronic mail documents; (B) program logic for determining with which of the plurality of categories a received electronic mail document is associated; (C) a memory for storing received electronic mail documents, (D) program logic for storing a received electronic mail document in the memory in accordance with which of the plurality of categories the received electronic mail document is associated; and (E) program logic for simultaneously displaying received electronic mail documents associated with selected of the plurality of categories in accordance with selection criteria.

BRIEF DESCRIPTION OF THE DRAWINGS

The above and further advantages of the invention may be better understood by referring to the following description in conjunction with the accompanying drawings in which:

FIG. 8A is a conceptual illustration of a micro view of a document as part of a conversation-thread tree in accordance with the present invention;

FIG. 10D illustrates conceptually the relationship between the components of the system in which the present invention may be utilized;

FIGS. 12-13 are conceptual illustrations of an inbox and various aspects thereof in accordance with the present invention;

DETAILED DESCRIPTION

Figure 1:
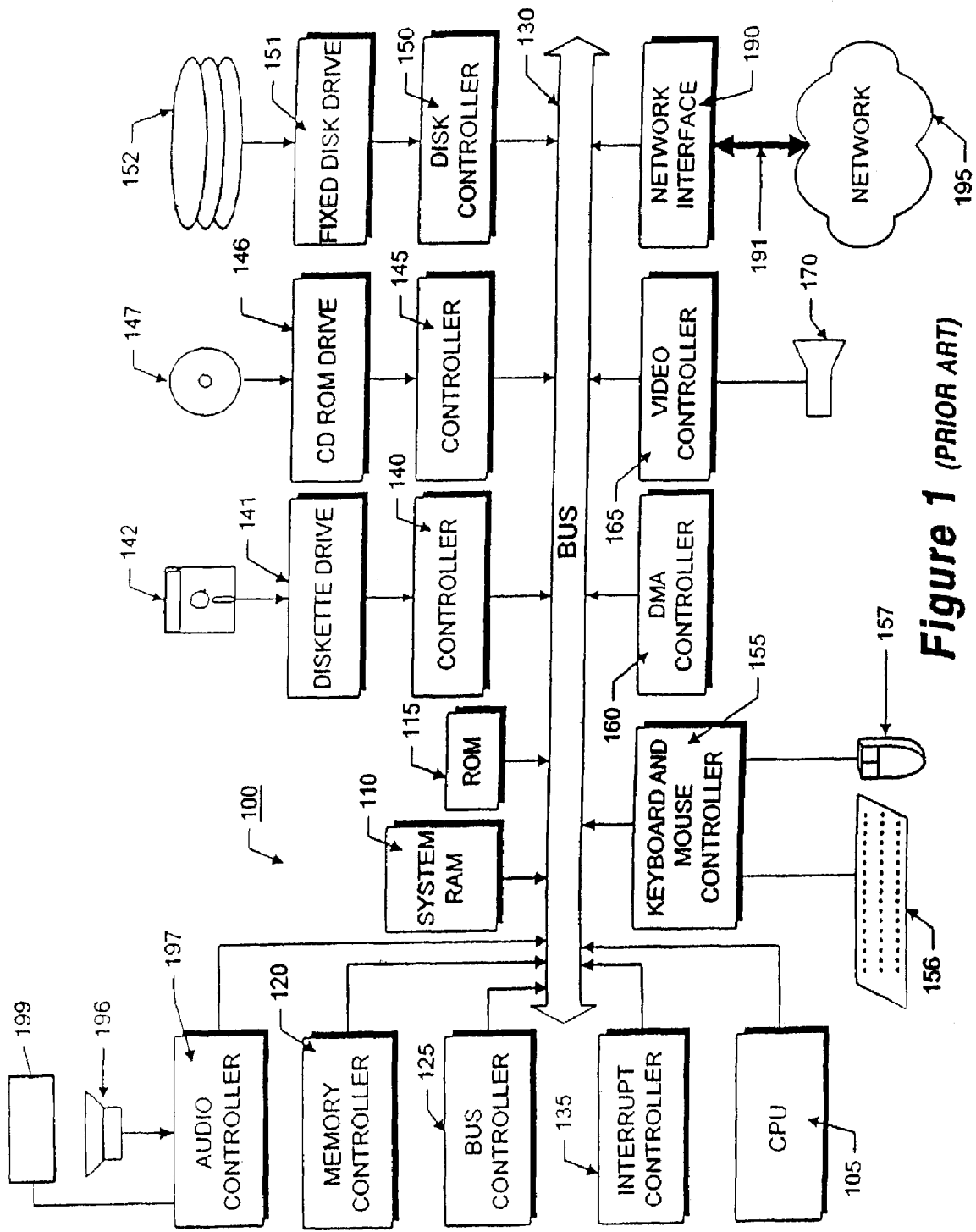
FIG. 1 is a block diagram of a computer systems suitable for use with the present invention.

FIG. 1 illustrates the system architecture for a computer system 100, such as a Dell Dimension 8200, commercially available from Dell Computer, Dallas Tex., on which the invention can be implemented. The exemplary computer system of FIG. 1 is for descriptive purposes only. Although the description below may refer to terms commonly used in describing particular computer systems, such as an IBM Think Pad computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertiable into diskette drive 141 which is, in turn, connected to bus 130 by a controller 140. Similarly, CD ROM 147 is insertable into CD ROM drive 146, which is connected to bus 130 by controller 145. Hard disk 152 is part of a fixed disk drive 151, which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic use interface presented thereon by an application or the operating system, in addition to or in combination with any keyboard, pointing device, joystick, voice recognition system, speakers, microphone or any other mechanism through which the user may interact with the computer system. Computer system 100 also includes a communications adapter 190, which allows the system to be interconnected to a local area network (LAN) or a wide area network (WAN), schematically illustrated by bus 191 and network 195.

Figure 2:
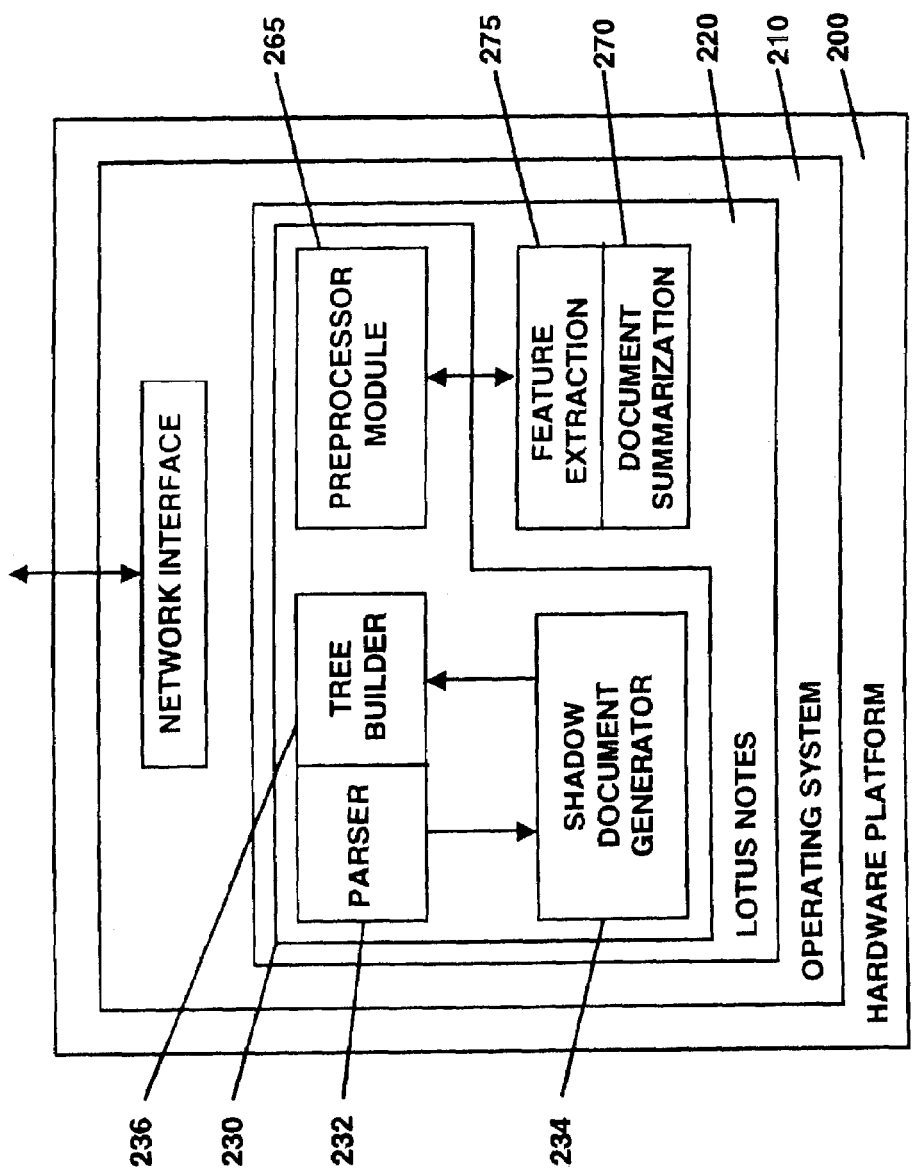
FIG. 2 is a illustrates conceptually the relationship between the components of the system in which the present invention may be utilized.

Computer system 100 is generally controlled and coordinated by operating system software, such as the WINDOWS NT, WINDOWS XP or WINDOWS 2000 operating system, commercially available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including OS/2, AIX, UNIX and LINUX, DOS, etc. The relationship among hardware 200, operating system 210, and user application(s) 220 is shown in FIG. 2. One or more applications 220 such as Lotus Notes or Lotus Sametime, both commercially available from International Business Machines Corporation, Armonk, N.Y., may execute under control of the operating system 210. If operating system 210 is a true multitasking operating system, multiple applications may execute simultaneously.

In the illustrative embodiment, the present invention may be implemented using object-oriented technology and an operating system which supports execution of object-oriented programs. For example, the inventive code module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the Java programming language using object-oriented programming techniques. Java is a compiled language, that is, programs are written in a human-readable script and this script is then provided to another program called a compiler which generates a machine-readable numeric code that can be loaded into, and directly executed by, a computer. As described below, the Java language has certain characteristics which allow a software developer to easily use programs written by others while still providing a great deal of control over the reuse of programs to prevent their destruction or improper use. The Java language is well-known and many articles and texts are available which describe the language in detail. In addition, Java compilers are commercially available from several vendors including Borland International, Inc. and Microsoft Corporation. Accordingly, for reasons of clarity, the details of the Java language and the operation of the Java compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

Network Environment

The illustrative embodiment of the invention may be implemented as part of Lotus Notes® and a Lotus Domino server, both commercially available from Lotus Development Corporation, Cambridge, Mass., a subsidiary of International Business Machines Corporation, Armonk, N.Y., however it will be understood by those reasonably skilled in the arts that the inventive functionality may be integrated into other applications as well as the computer operating system.

The Notes architecture is built on the premise of databases and replication thereof. A Notes database, referred to hereafter as simply a "database", acts as a container in which data Notes and design Notes may be grouped. Data Notes typically comprises user defined documents and data. Design Notes typically comprise application elements such as code or logic that make applications function. In Notes, every database has a master copy which typically resides on the server or user platform where the database was created. All other copies of the database are replicas of the master copy. Replicas of databases may be located remotely over a wide area network, which may include as a portion thereof one or more local area networks. In the illustrative every object within a Notes database, is identifiable with a unique identifier, referred to hereinafter as "Note ID", as explained hereinafter in greater detail.

A "document" as used herein may refer to a document, database, electronic mail message code, a "Note" or any file which is accessible and storable by a computer system. The Notes Storage Facility (NSF) architecture defines the manner in which documents and databases are created, modified and replicated among Notes servers across a computer network. Information regarding the Notes Storage Facility and its specification is available from Lotus Development Corporation as well as on-line at www.Notes.net.

Figure 3:
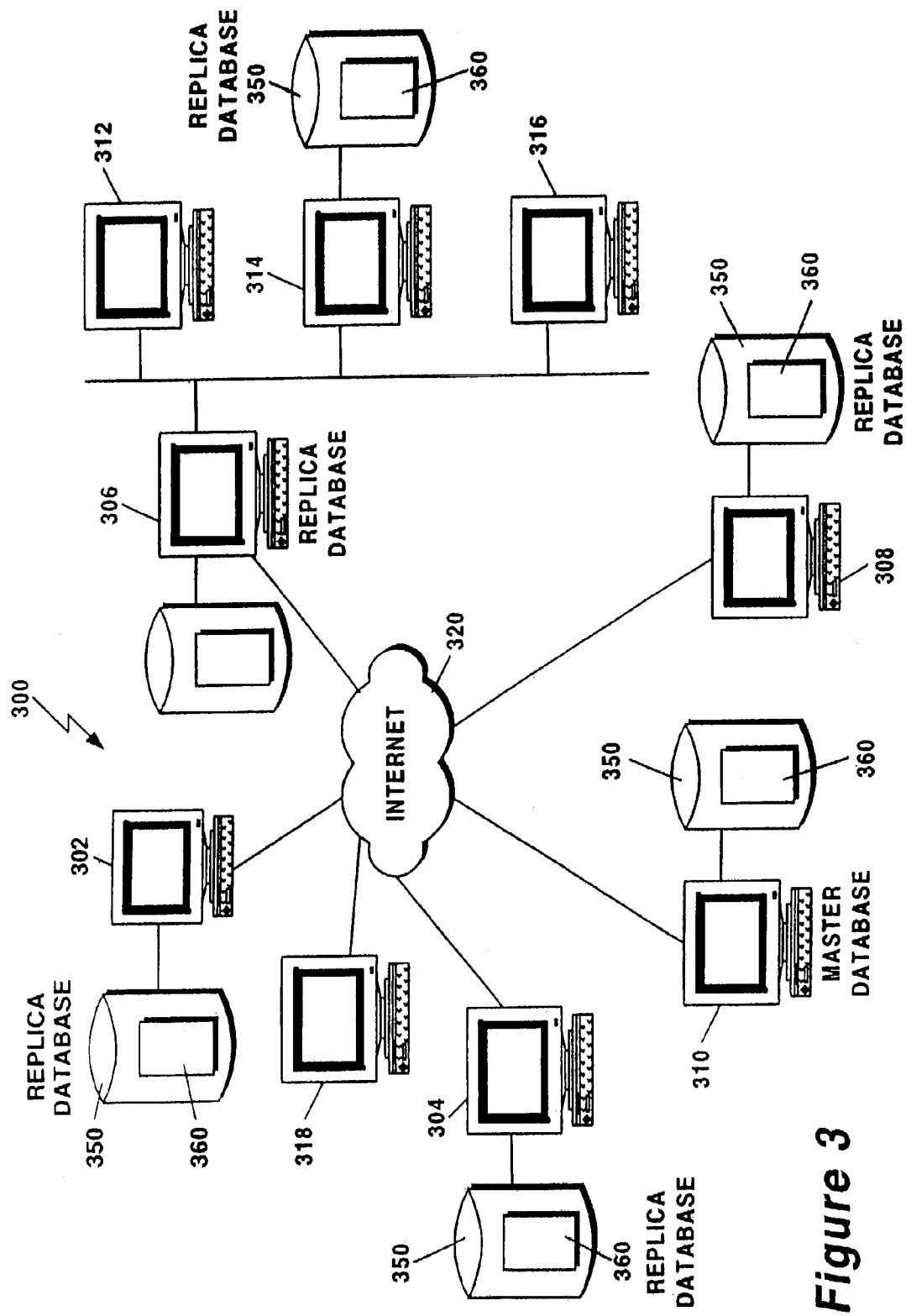
FIG. 3 is a conceptual illustration of a computer network environment in which the present invention may be utilized.

FIG. 3 illustrates a network environment in which the invention may be practiced, such environment being for exemplary purposes only and not to be considered limiting. Specifically, a packet-switched data network 300 comprises a servers 302-310, a plurality of Notes processes 310-316 and a global network topology 320, illustrated conceptually as a cloud. One or more of the elements coupled to global network topology 320 may be connected directly or through Internet service providers, such as America On Line, Microsoft Network, Compuserve, etc. As illustrated, one or more Notes process platforms may be located on a Local Area Network coupled to the Wide Area Network through one of the servers.

Servers 302-308 may be implemented as part of an all software application which executes on a computer architecture similar to that described with reference to FIG. 1. Any of the servers may interface with global network 320 over a dedicated connection, such as a T1, T2, or T3 connection. The Notes client processes 312, 314, 316 and 318, which include mail functionality, may likewise be implemented as part of an all software application that run on a computer system similar to that described with reference to FIG. 1, or other architecture whether implemented as a personal computer or other data processing system. As illustrated conceptually in FIG. 3, servers 302-310 and Notes client process 314 may include in memory a copy of database 350 which contains document 360. For purposes of illustration, the copy of database 350 associated with server 310 is designated as the "master" copy of database 350. All other copies of database 350 within the network are replica copies of the master copy.

Shadow Document Generation

To implement the primary functionality of the present invention in a Lotus Notes environment, a module, referred to hereafter as Notes Mail Agent 230 interacts with the existing functionality, routines or commands of Lotus Notes client application and/or a Lotus "Domino" server, many of which are publicly available. The Lotus Notes client application, referred to hereafter as application 220, executes under the control of operating system 210 which in turn executes within the hardware parameters of hardware platform 200. Hardware platform 200 may be similar to that described with reference to FIG. 1. Mail Agent 230 interacts with application 220 and with one or more documents 260 in databases 250. The functionality of Mail Agent 230 and its interaction with application 220 and databases 250 is described hereafter. In the illustrative embodiment, module 230 may be implemented in an object-oriented programming language such as C++. Accordingly, the data structures and functionality may be implemented with objects displayable by application 220 may be objects or groups of objects. In light of the description herein, the construction and function of module 230 is within the scope of understanding of those reasonably skilled in the arts.

Mail Agent 230 comprises a parser 232, a shadow document generator 234 and a conversation thread tree builder 236. The primary function of Notes Mail Agent 230 is to create a shadow document from an original document, which, in the illustrative embodiment, is an electronic mail message. Typically, this process is triggered by an occurrence of an event. In the first illustrative embodiment, Mail Agent module 230 may be invoked upon the sending of an electronic mail message by a Lotus Notes client application. In this instance, Agent 230 may reside within the Lotus Notes client, as illustrated in FIG. 2 or on the same system. Simultaneously, a Lotus Notes Mail Agent 230 may execute on a Lotus Notes "Domino" server and function to create a shadow document for each document or electronic message transmitted from other non-Notes processes prior to delivery to a recipient Notes process. The shadow documents are generated transparently to the actual user sending or receiving the electronic message. Alternatively, in a second illustrative embodiment, described herein Mail Agent 230 may be invoked upon the receipt of a request to delete an original document or electronic mail message.

Mail Agent 230 creates a shadow document from an original document by generating a file containing data related to the document. In the illustrative embodiment, shadow documents are stored as documents in a Lotus Notes database and are accessible via the Notes Storage Facility (NSF) Application Program Interfaces. Specifically, shadow documents are stored in a Notes mail database. The data maintained in a shadow document defines the parent/child relationships among original documents and their respective shadow documents. In the illustrative embodiment, a new electronic mail message is considered a parent document and serves as the root from which a new shadow tree may be derived, as explained hereinafter. Any replies to the original electronic mail message is/are considered a child/ children document(s). Within a conversation thread, and a hierarchical tree that represents such thread, children documents derive from a common root document. Accordingly, a parent/child tree hierarchy representing a conversation thread terminates at one extreme with a root document, or a shadow document thereof, and, at the other extreme, with one or more children documents, or shadows thereof, as the leaves of the tree.

Figure 4:
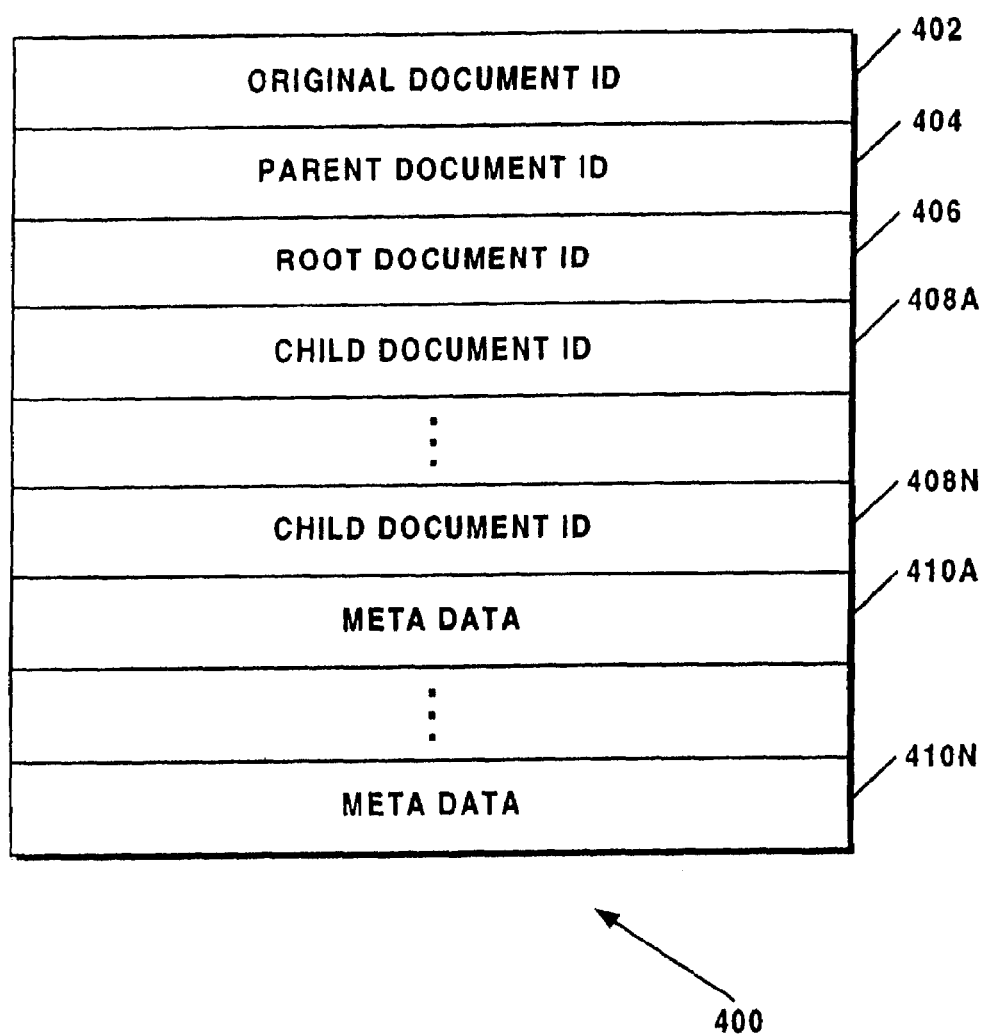
FIG. 4 is a conceptual illustration of a data structure in accordance with the present invention.

FIG. 4 illustrates conceptually the structure and content of a shadow document 400 in accordance with the present invention. As shown, shadow document 400 comprises an Original Document Identified (ID) 402, a Parent Document ID 404, an optional Root Document ID 406, zero or more Child Document IDs 408a-n, and optional Meta Data fields 410a-n. Original Document ID 402 may comprise a pointer to the original document, e.g. an electronic mail message, which may no longer exist in the database. Parent Document ID 404 may comprise a pointer to the immediate parent document, whether a shadow or original document, in the tree hierarchy. Parent Document ID 404 may have a null value if the subject document is the root of the conversation thread tree. Optional Root Document ID 406 may comprise a pointer to the root of the conversation thread tree, whether shadow or original. Root Document ID 406 allows for efficiency in traversing the tree hierarchy. Child Document IDs 408a-n may comprise a list of pointers to the immediate children documents, whether shadow or original, in the tree hierarchy, if any. In the illustrative embodiment the value of Ids 402-408 may be the Notes ID value for a document. Additionally, Meta Data fields 410a-n may comprise meta data describing the original electronic message documents and/or any attachments thereto.

In the illustrative embodiment, the meta data may include such logistical information as sender, receiver, original size, subject, date, any carbon copy recipients, etc. associated with the document. In addition, key words or summaries of the content of the document or any attachments may likewise be included. Such functionality may be performed by Mail Agent 230 with calls to commercially available products such as Intelligent Miner for Text from IBM Corporation, Armonk, N.Y., or KeyView from Verity, Sunnyvale, Calif., which then parse and filter the content to find key words or create summaries.

At the time a document, particularly an electronic message is generated, shadow document generator 234 includes code routines or objects, which, upon invocation sets up a shadow document and identifies any parent and/or child documents of the subject document and, optionally, further identifies the root document of a conversation-thread tree to which the subject document is a member. A similar process is performed by the shadow document generator 234 of a Mail Agent 230 executing on a Domino server. Parser 232 includes code routines or objects, which, upon invocation sets up a shadow document and parses the original document and any header of the following data fields: sender, receiver, original size, subject, date, any carbon copy receivers, attachment names, etc. and makes call to filtering software modules, as necessary. A shadow file is stored in an electronic mail database which may then be replicated in the manner previously described in the Notes environment.

Figure 5A:
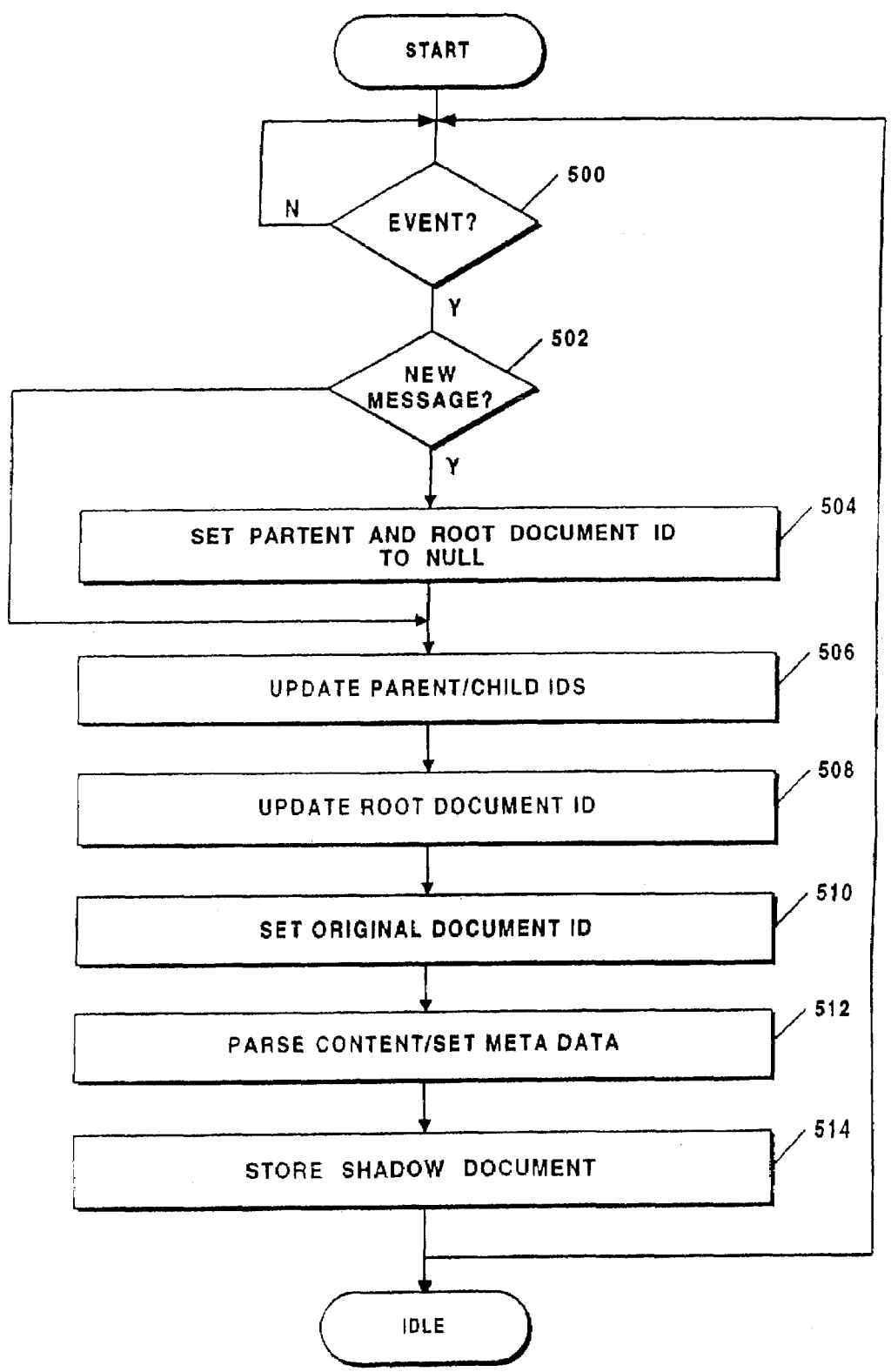
FIGS. 5A-B form a flow chart illustrating the process steps performed by the present invention.

FIGS. 5A and B are flow charts illustrating the process steps performed by parser 232 and shadow document generator 234 during the present invention. As illustrated in FIG. 5A, Mail Agent 230 first detects the occurrence of a triggering event as illustrated by decisional step 500. Such event may include the sending or receipt of an electronic message, or, alternatively a request to delete an electronic message. Next, Mail Agent 230 determines if the electronic message is a new message, as illustrated by decisional step 502. Within a Lotus Notes electronic mail domain, it is possible to determine with existing object methods to which message an incoming message is a reply. If the incoming message is from the Internet or from a non-Notes environment, a conventional algorithm can be used to determine if the message is a new message or a reply to an existing message by determining if the message has an "In-Reply-To" header, or whether the subject lines of the message match an existing message or shadow document. If so, Root Document ID 406 and Parent Document ID 404 are both set to null, as illustrated by procedural step 504. Otherwise, Mail Agent 230 sets the Parent Document ID 404 to a pointer value referencing the parent document and simultaneously modifies one of the Child Document IDs 408a-n of the parent document to reference the subject shadow document, as illustrated by procedural step 506. Additionally, Mail Agent 230 sets Root Document ID 406 to reference the root of the conversation thread tree, as illustrated by procedural step 508. Mail Agent 230 then sets the Original Document ID 402 to reference the original document from which the shadow document was created, as illustrated by procedural step 510. If the original document has been deleted, the value of Original Document ID 402 is set to null. Finally, Parser 232 parses the header information of the original electronic message for meta data and populates Meta Data fields 410a-n accordingly, as illustrated by procedural step 512. Parser 232 may optionally make procedure calls for scanning of the document content or any of its attachment for key words or phrases to be saved as meta data. Thereafter, the shadow document is stored in memory, which, in the illustrative embodiment, is a mail database, as illustrated by procedural step 514.

The above-described process is substantially the same whether the Mail Agent 230 resides in the Notes client or a Domino server in a Notes environment. In addition, if the triggering event in step 500 was a request for deletion of an original document, instead of pointing only to other shadow documents, the pointer values of the IDs 404-408 within shadow document 400 may also reference other original documents as well. In this embodiment, shadow documents serve as placeholders for missing original documents in the original conversation thread hierarchy.

Given the content of shadow documents and their relationship to the original or root document, an algorithm in Tree Builder 236 can be used to traverse the chain of pointers or references to the parent of each shadow document, and, once the root has been identified, to then recursively traverse all references to each child document within the conversation thread. In this manner, a complete tree representing the conversation thread may be determined from the data collected by Tree Builder 236. The data identifying the documents or nodes of the tree, can then provided to program code which may visually render the tree for the users benefit, as discussed in greater detail herein.

Figure 5B:
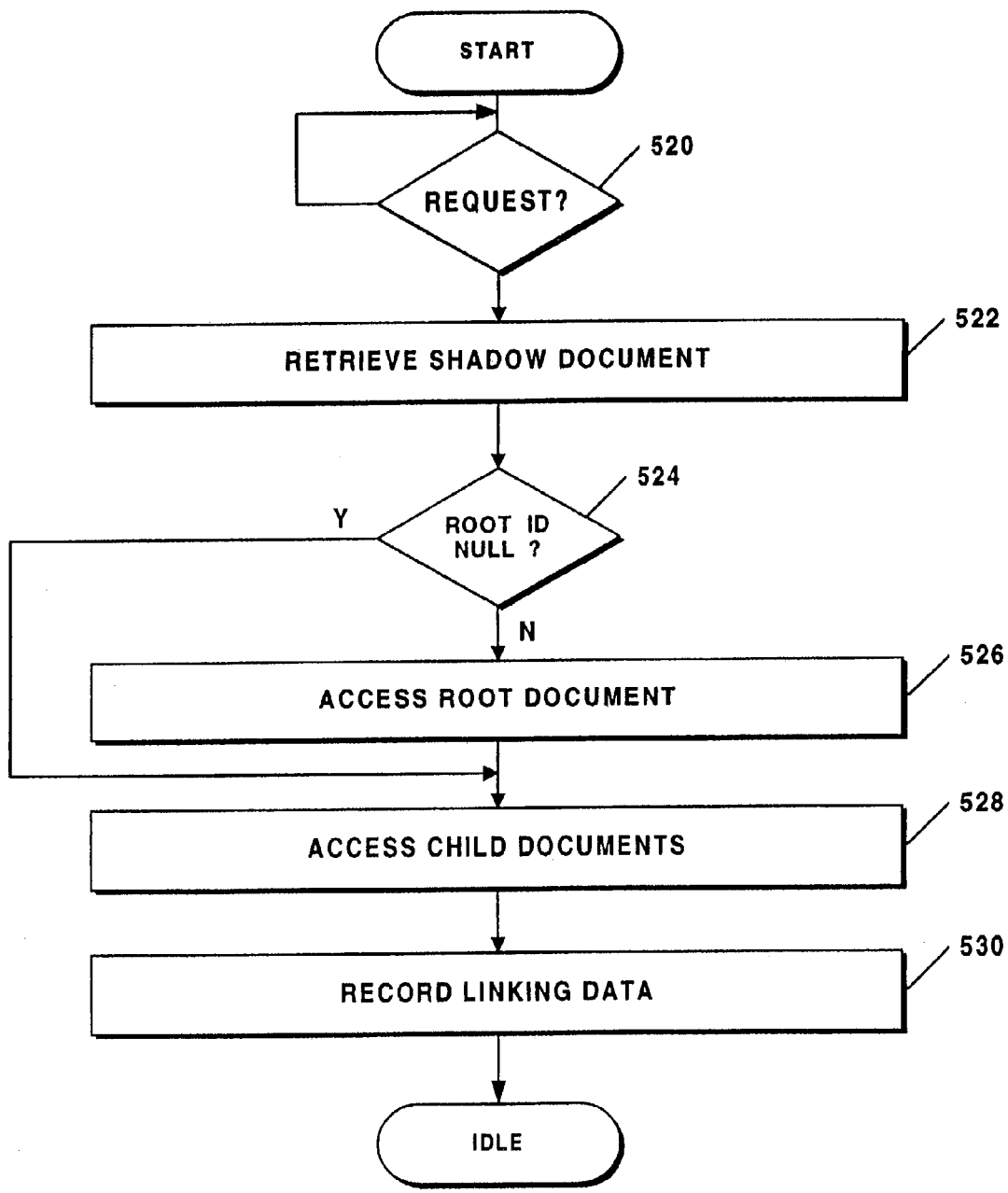

Referring to FIG. 5B, the process steps performed by conversation thread Tree Builder 236 is illustrated. Initially, Tree Builder 236 receives a request to construct a conversation thread tree, as illustrated by decisional step 520. Such request may be triggered by any number of different events including selection of a specific command within the Notes client application 220, automatically upon entering the mail function of the Notes client, or upon selection of an electronic message from a mail viewer utility. Tree Builder 236 receives the identifier of a document, typically a Notes ID, and retrieves the corresponding shadow document data from the mail database, as illustrated by procedural step 522. Next, Tree Builder 236 examines the Root Document ID field of the accessed shadow document and determines if the field contains a null value, indicating that the subject document is a root document, as illustrated by decisional step 524. If the value of the Root Document ID field is not null, Tree Builder 236 retrieves the document identified by the pointer within the Root Document ID field, whether a shadow or original document, and records the document identifier and pointer value in a tree data document or database, as illustrated by procedural step 526. Next, Tree Builder 236 resolves the child document IDs 408$a$-$n$ in the document identified by the pointer within the Root Document ID field, i.e. the root document, as well as each of their respective child documents, in a recursive manner, as will be understood by those reasonably skilled in the arts, until the Child Document ID fields in all child documents are null, indicating that the leaf nodes within the conversation thread tree have been identified, as illustrated by steps 528. As will be understood by those reasonably skilled in the arts, any number of known algorithms for iteratively traversing data values linked in a hierarchical manner may be utilized in step 528 to resolve the references to child documents from a parent document until no further child document exists, indicating a leaf node in the conversation thread have been identified. Tree Builder 236 progressively records the document IDs in the tree document or database during the resolution process and, upon completion, stores such tree document or database in memory, as illustrated by steps 530.

In an alternative implementation, since a large number of electronic mail documents are received, a large number of shadow documents will be generated. To reduce memory requirements, while still providing the functionality of the invention, the data from all shadow documents within a conversation thread may be stored in a single tree document within a Lotus Notes database, instead of multiple documents. In such embodiment, a single tree document may include all of the meta and linking data of the individual nodes within the conversation thread tree and may be kept in the database using XML format or other markup language utilizing tags. Further, for run-time operation, the tree "documents" may be represented only as data structures within the computer memory. Such implementation may be more efficient in an environment where the thread trees can be recomputed quickly relative to storing and retrieving the thread trees from a memory. Such an embodiment is described in greater detail hereafter with reference to FIGS. 17A-C.

Visualization

With complete message thread information using the techniques described herein, visualization of conversation thread trees is possible. Since conversation thread trees, from observations, are not very deep nor very bushy in general, a simple graphical representation of the message thread and highlighting of the interesting relationships among the parties involved in the conversation is possible. The tree data compiled by generator 236 may then be provided to a graphics program for visually rendering a conceptual representation of a conversation thread tree. For example, the existing DiscussionsThreadsView functionality within Notes can be used to construct and display a complete conversation thread.

In the illustrative embodiment, we are using Lotus Domino for the underlying object store. The user interface may be developed using IBM Sash, a development environment based upon dynamic HTML and JavaScript. Alternatively, a JAVA applet running in a portion of the Notes client gets the Notes document data representing the tree Notes from the data base and renders the tree graphically. Notes may be rendered with different graphic elements such as color to define relationships. By selecting one of the nodes in a tree by user can, in one embodiment, cause a low resolution display of that document, either the original or the shadow document, to be displayed within the context of the tree.

Figure 6A:
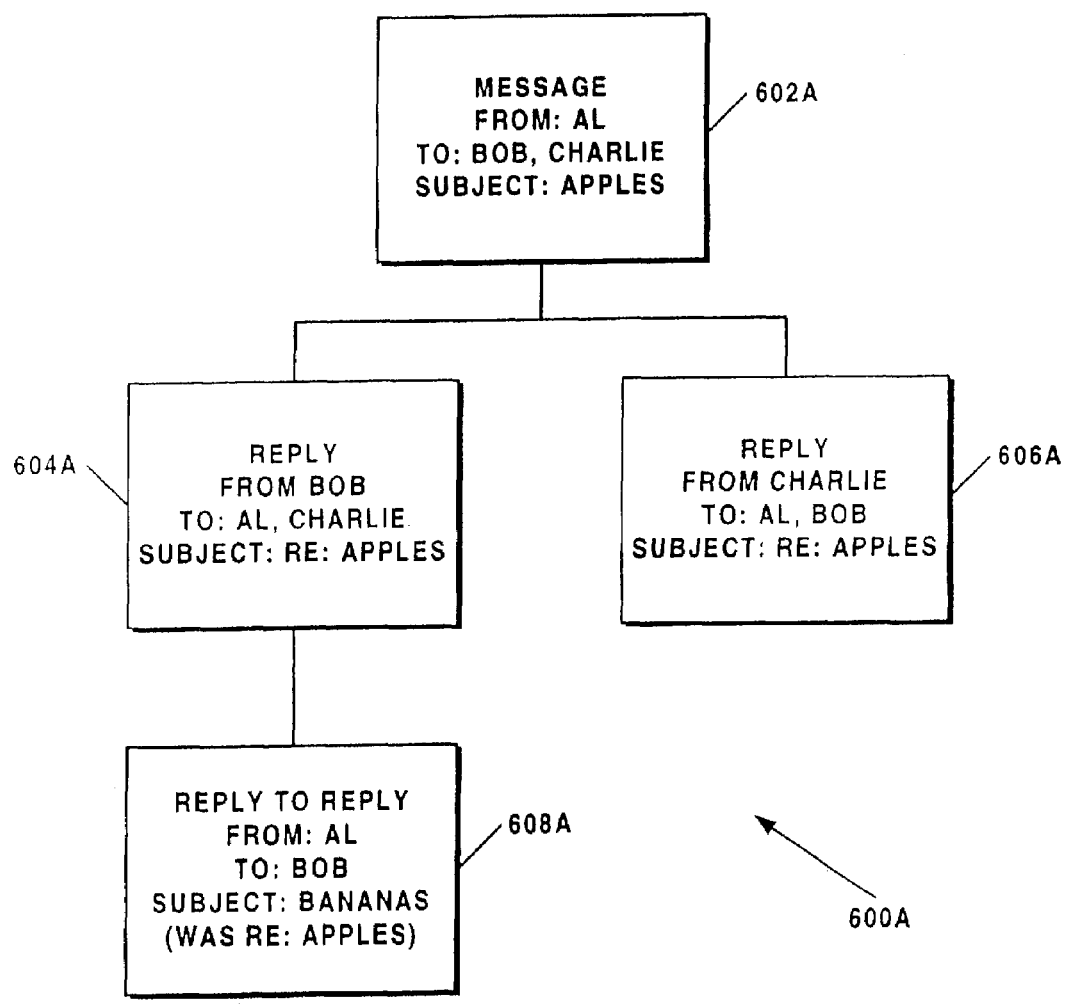
FIGS. 6A-D are conceptual illustrations of a conversation-thread trees in accordance with the present invention.
Figure 6B:
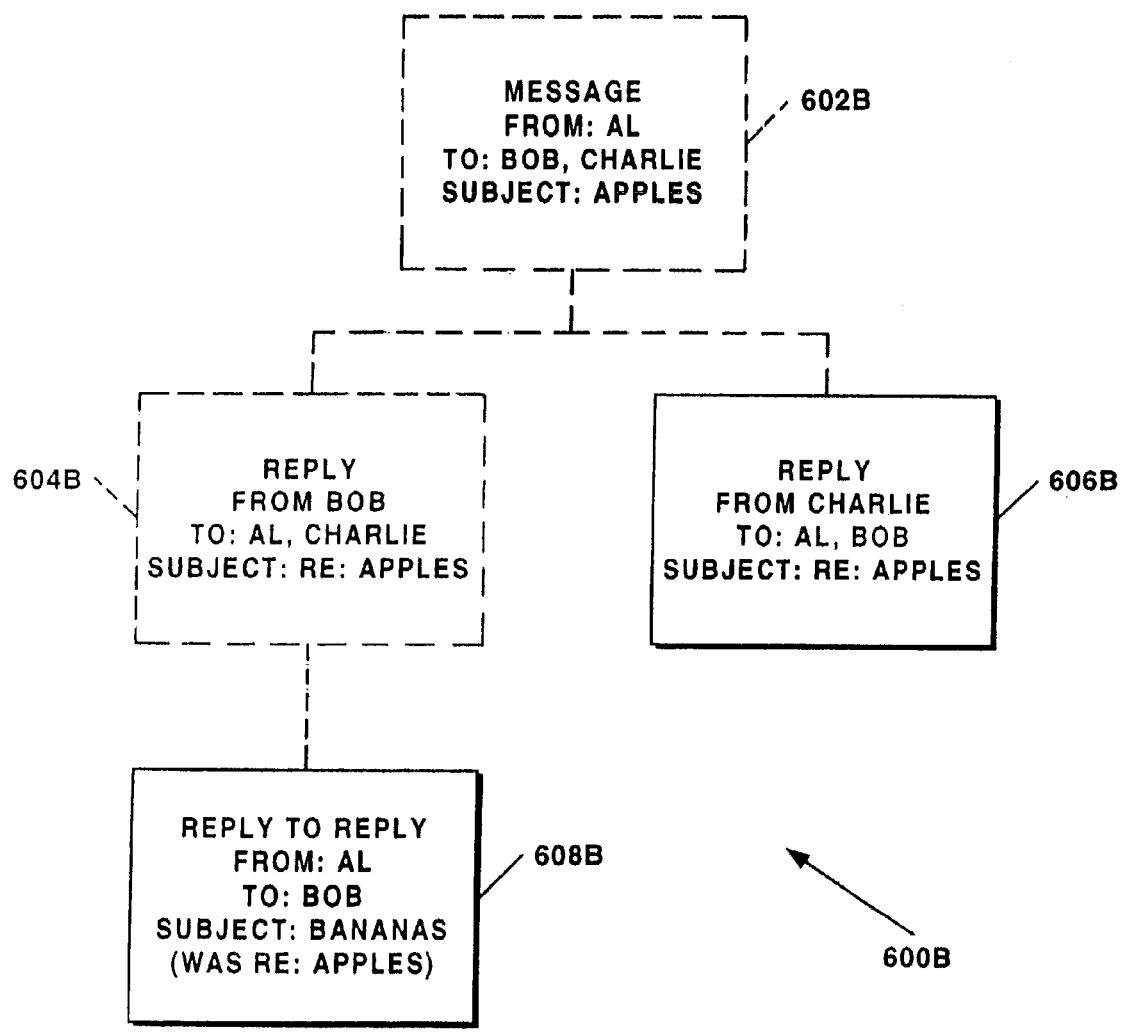
Figure 6C:
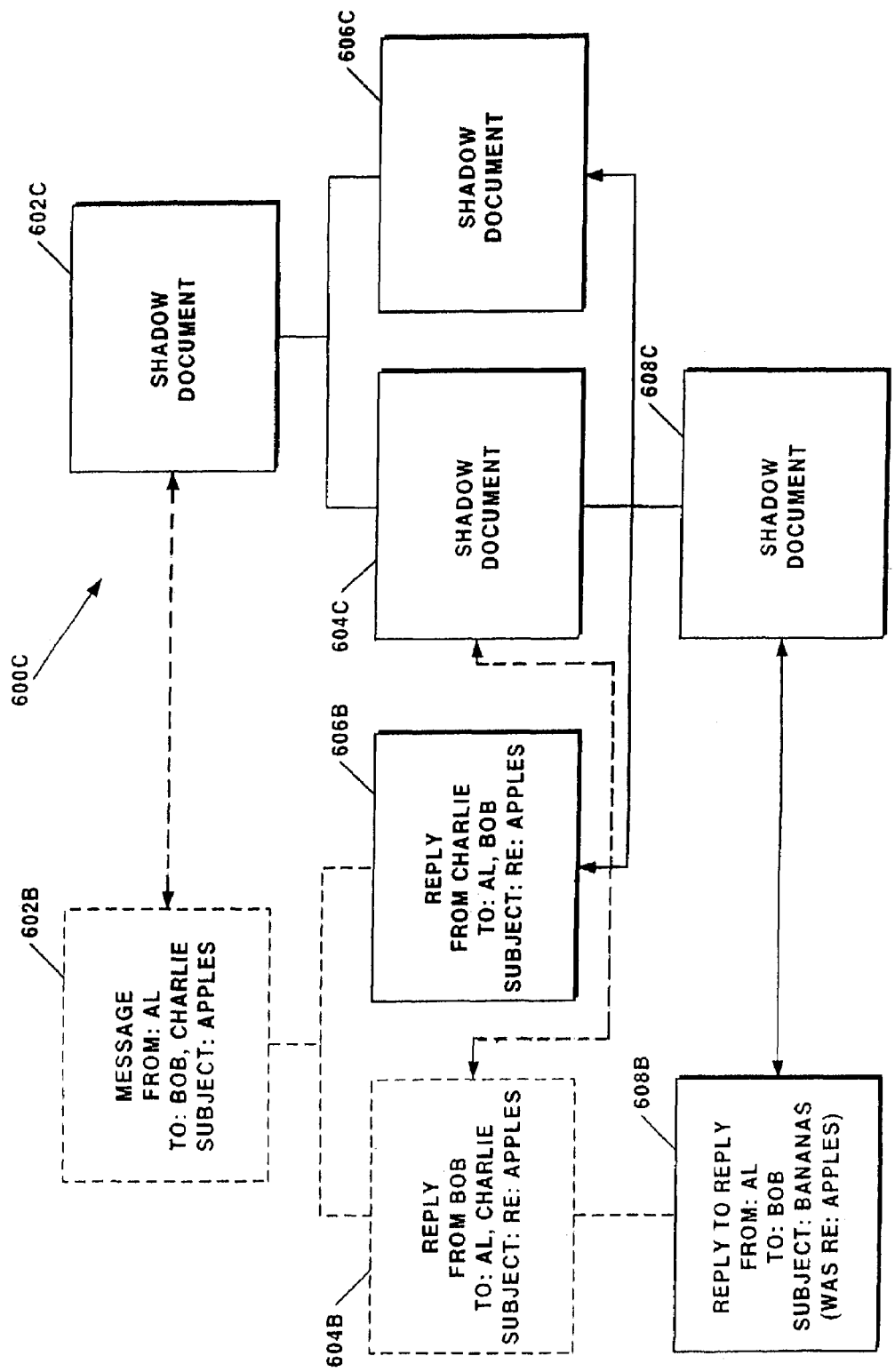
Figure 6D:
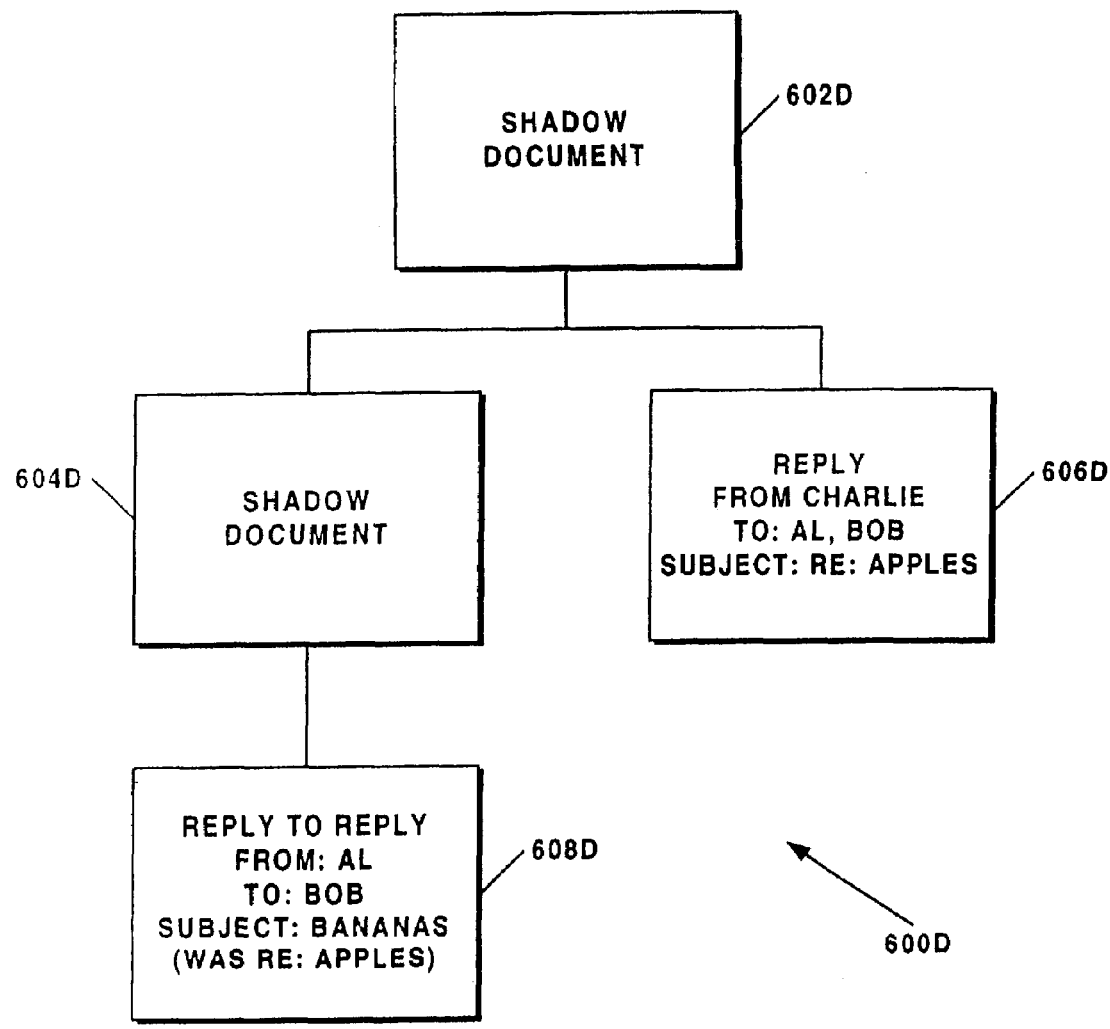

FIGS. 6A-D illustrate a conversation thread in the form of a document trees 600A-D. In FIG. 6A, tree 600A represents an original conversation thread in which an electronic message from Al to Bob and Charlie serves as the root document 602A of the tree 600A. Documents 604A, 606A, and 608A are replies or replies to replies and therefore child documents of parent/root document 602A. For the sake of illustration, assume that documents 602A and 604A are deleted by user Bob, resulting in the conversation thread tree 600B as illustrated in FIG. 6B. In FIG. 6B, documents 602B and 604B are shown in phantom, indicating that the original document has been deleted. With the present invention, a shadow tree 600C was created comprising documents 602C-608C, which are the shadow documents of documents 602A-608A, respectively. The relationship of shadow tree 600C and the original conversation thread tree 600A is illustrated in FIG. 6C. The shadow tree 600C remains in tact and may be constructed and viewed as necessary despite original documents 602A and 604A having been deleted. In an embodiment in which shadow documents are created upon a request to delete the original document, such as that illustrated in FIG. 6D, the conversation thread tree 600D is a hybrid tree consisting of shadow documents 602C-604C and original documents 606D and 608D.

Figure 7:
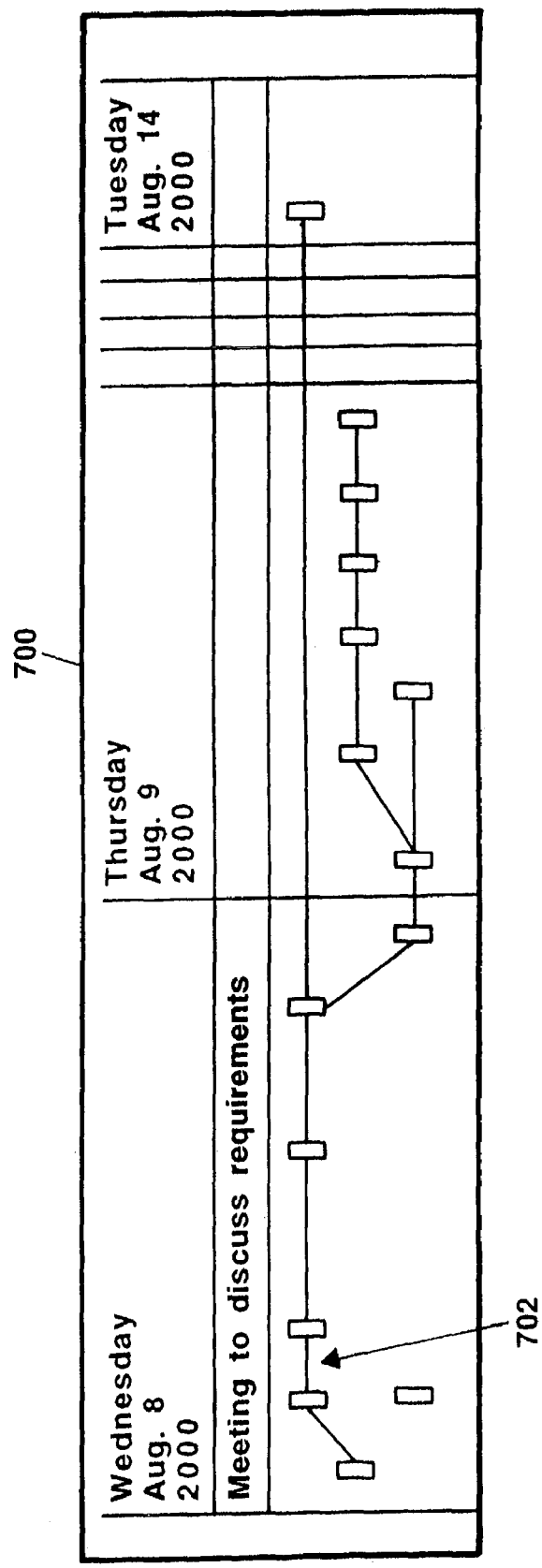
FIG. 7 is a conceptual illustration of an alternative conversation-thread tree superimposed with a time-line.

One attribute of electronic mail that is valuable to visualize is the time when a message was received. The present invention combines the message trees described above with a timeline to produce a more useful visualization. FIG. 7 illustrates a design for displaying a message tree on a timeline. In FIG. 7, the vertical lines represent day boundaries. The text in the middle band is the subject of the thread. The nodes may be color-coded to indicate the relationship of the message senders to the recipient. Note that time is non-linear in this display; days with little or no activity are shown compressed to avoid the problem of large gaps in the time display. For example, a timeline can be broken to show a large passage of time. This might be useful if email is received from someone infrequently. In that case, the system could show on the timeline the most recent threads of conversation with that person. Also, information from people's calendars may be incorporated to aid in the search. For example, a user might remember that he/she received a certain piece of mail just before going for vacation last summer. By incorporating these "milestones" on the timeline view the information can be found more easily. The present invention places message nodes proportionally within a day even though the width of a day on the timeline may vary.

The design of a new email client in accordance with the invention is shown in FIG. 4. The client combines a traditional list of email messages with a time-based message tree. The node for the selected message may be replaced with a reduced-resolution overview. A dimmer, secondary highlight also connects the messages within the thread.

The user interface 800 of an electronic mail client in accordance with the invention may have the format shown in FIG. 8A. The user interface combines a traditional list of electronic mail messages 802 with a conversation tree 804.

The node associated with the selected message 806 may be replaced with a reduced-resolution overview 808. Alternatively, the overview may be replaced with a window containing a summary of the electronic mail messages 802 and/or all or part of the conversation-thread tree 804, using the techniques described herein. Also, a dimmer, secondary highlight or other graphic indicia may be used to highlight messages within list 802 which are also displayed in the conversation-thread tree 804.

Electronic Mail/Thread Summarization Algorithm

The illustrative embodiment of the present invention Mail Agent 230 may be implemented as part of Lotus Notes and Domino products from IBM Corporation and utilize the functionality of a commercially-available document summarization, such as IBM Intelligent Miner for Text, as a back-end module for processing electronic mail messages. The inventive algorithm described herein, however, is not specific to Lotus Notes, Domino or Intelligent Miner for Text, and may be implemented using any number of electronic mail systems and commercially-available document summarization programs. In the illustrative embodiment, a preprocessing module 265 of Mail Agent 230 takes, as input, an electronic mail message, makes appropriate calls to the document summarization module 270, and outputs a summary of the electronic mail message. The summarization algorithm performed by preprocessing module 265 uses knowledge specific to the electronic mail domain to preprocess an electronic mail message so that document summarization module 270 can generate a useful summary from the electronic mail message. The summarization algorithm removes extraneous headers, quoted text, forward information, and electronic mail signatures, to leave more useful text to be summarized. If an enclosing electronic mail thread exists, the summarization algorithm makes use of the electronic mail message's ancestors to provide additional context for summarizing the electronic mail message.

In the inventive summarization algorithm, the selected or current document, typically an electronic mail document m, is preprocessed by preprocessing module 265, as described hereafter, to create an intermediate document d. The intermediate document d is then summarized with document summarization module 270 and the output thereof added to a summary document s. Each ancestor document p of the current document, i.e. parent, grandparent, etc., is similarly preprocessed into its own intermediate document d. Each ancestor intermediate document d is also then summarized with document summarization module 270 and the output thereof prepended to the summary document s. When all ancestor documents p within a conversation thread have been preprocessed and summarized, the summary document s is finished.

The specific details of the electronic mail message summarization algorithm are set forth below with reference to the flowcharts of FIGS. 8B-E. Upon selection of an electronic mail message m for summarization by mail agent 230 in accordance with one of the previously mentions scenarios, a temporary copy of message m is stored in memory, and the thread, if any, to which the message belongs is determine by preprocessing module 265, as illustrated by procedural step 960. This process can be performed using known algorithms for discovering message reply parent-child relationships, such as the getParentDocumentUNID( ) function found in Lotus Notes, the In-Reply-To header often found in electronic mail, or the shadow document method described earlier. If electronic mail message m belongs to an existing electronic mail thread, as illustrated by decisional step 962, the thread is processed by preprocessing module 265 to synthesize a new intermediate concept-level document d. In such process, preprocessing module 265 retrieves the first ancestor, i.e. parent p, of message m and compares electronic mail message m to parent p and any text quoted from the parent p by the "reply with history" functionality is removed, as illustrated by procedural step 964. Thereafter, any "To:", "Cc:", "Bcc:", and "From:" headers remaining in electronic mail message m are removed by preprocessing module 265, as illustrated by procedural step 966. Next, preprocessing module 265 removes any headers, as illustrated by procedural step 968, since headers tend to get highlighted by the summarization module 270. If any "Subject:" headers are found by preprocessing module 265, the subject is included in the intermediate document d on a line by itself, as illustrated by procedural step 970, to give the intermediate document d more context. Next, any electronic signatures in electronic mail message m are identified and removed by preprocessing module 265, as illustrated by procedural step 972. This process may occur by matching a character string against any automatically-generated permutations of the character string in the "From:" header of electronic mail message m, and is described in greater detail with reference to the flowchart of FIG. 10. Since signatures tend to get highlighted by the summarization module 270, the signatures are removed. Once electronic mail message m has been preprocessed, the intermediate document d is then summarized by document summarization module 270 and the output thereof added to a summary documents, as illustrated by procedural steps 974 and 976.

Next, preprocessing module 265 determines if electronic mail message m has a parent p, as illustrated by decisional step 978. This process may occur using the same inquiry algorithms as in step 960. In the tree-like hierarchical organization of a message thread, parent and children documents exist at adjacent levels of the hierarchical organization. The parent document exists at a level above the current or child document, and the current or child document exists at a level below the parent document, along the tree-like hierarchy. If message m has a parent p, process steps 964-976 are repeated with electronic mail message m's parent p, instead of m, in a recursive manner, until all ancestors of message m have been preprocessed, summarized, and the resulting individual document summaries prepended into summary document, that is the summaries are added into the summary document at the beginning, versus appending which adds the summaries to the current end of the summary document. Ancestors are any parent p of message m or any parent of a parent, etc., along the hierarchical organization of the conversation thread up to the root or original electronic document from which the thread developed.

Next, preprocessor 265 calls feature extraction module 275 and passes message m as the input thereto. The useful "features" found in the message, such as names, dates, and names of companies and/or products are extracted by feature extraction module 275 and the output thereof are added to the summary document s, as illustrated by procedural step 980. Thereafter, any dates mentioned in electronic mail message m are identified and extracted by preprocessing module 265 using expression matching and the results of the date extraction process added to the summary document s, as illustrated by procedural step 982.

If in step 962, it was determined that the electronic mail message m was not part of an existing thread, the message is parsed as the start of a new electronic mail thread with no ancestors, in a manner similar to that described with reference to steps 966-982, as explained herein.

Next, the summary document s generated by the summarization algorithm may be presented to the viewer and/or stored in memory, as illustrated by procedural step 984. In the illustrative embodiment described herein, the algorithm for summarization of electronic mail/threads can occur dynamically with the summarization data instantaneously presented to the user. For example, the summary of the electronic mail message and/or all or part of the conversation-thread may be displayed in a window on a user interface of a communication process, such as, for example, the user interfaces illustrated in FIGS. 7-8A. Alternatively, the presentation of the summary of the electronic mail message/thread may have any presentation format desired by the system designer and allowable by the user interface of the electronic mail application and the operating system. Such a display may occur upon selection of an electronic mail message from within the list of electronic mail messages, or simply whenever hovering over an electronic mail message from within the list of electronic mail messages with a pointing device cursor. In addition, the presentation may occur upon completion of the summarization of a complete electronic mail message thread or each time the summarization algorithm completes a summarization iteration associated with a document, allowing the viewer to see the summary grow progressively.

The data resulting from the electronic mail summarization process, either the message-specific intermediate documents d or the complete resulting summary document s may be stored in shadow document 400, as previously described. Similarly, the data resulting from summarization of the electronic mail/conversation thread may be stored in a single shadow document which includes all meta data and summarization data from a conversation tree. In such an embodiment, the shadow document containing the summarization of the complete conversation thread may be updated or recomputed each time a new electronic message related to the specific thread is summarized. Specific sub-algorithms used within the described technique for summarization of electronic mail/threads are described hereafter in greater detail.

Electronic Mail Signature Extraction

Figure 8B:
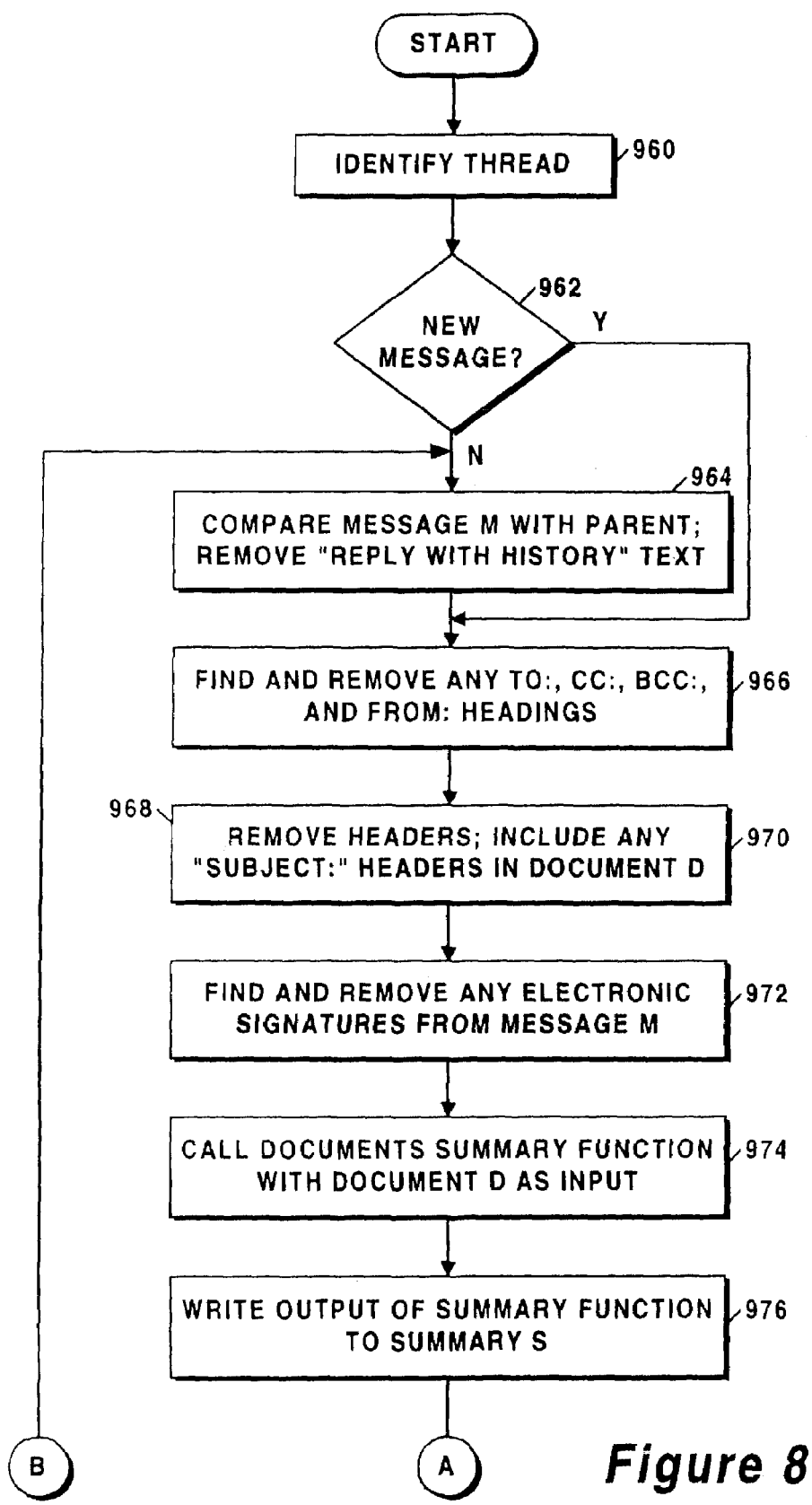
FIGS. 8B-C form a flow chart illustrating the process steps performed during the electronic mail/thread summarization process of the present invention.
Figure 8C:
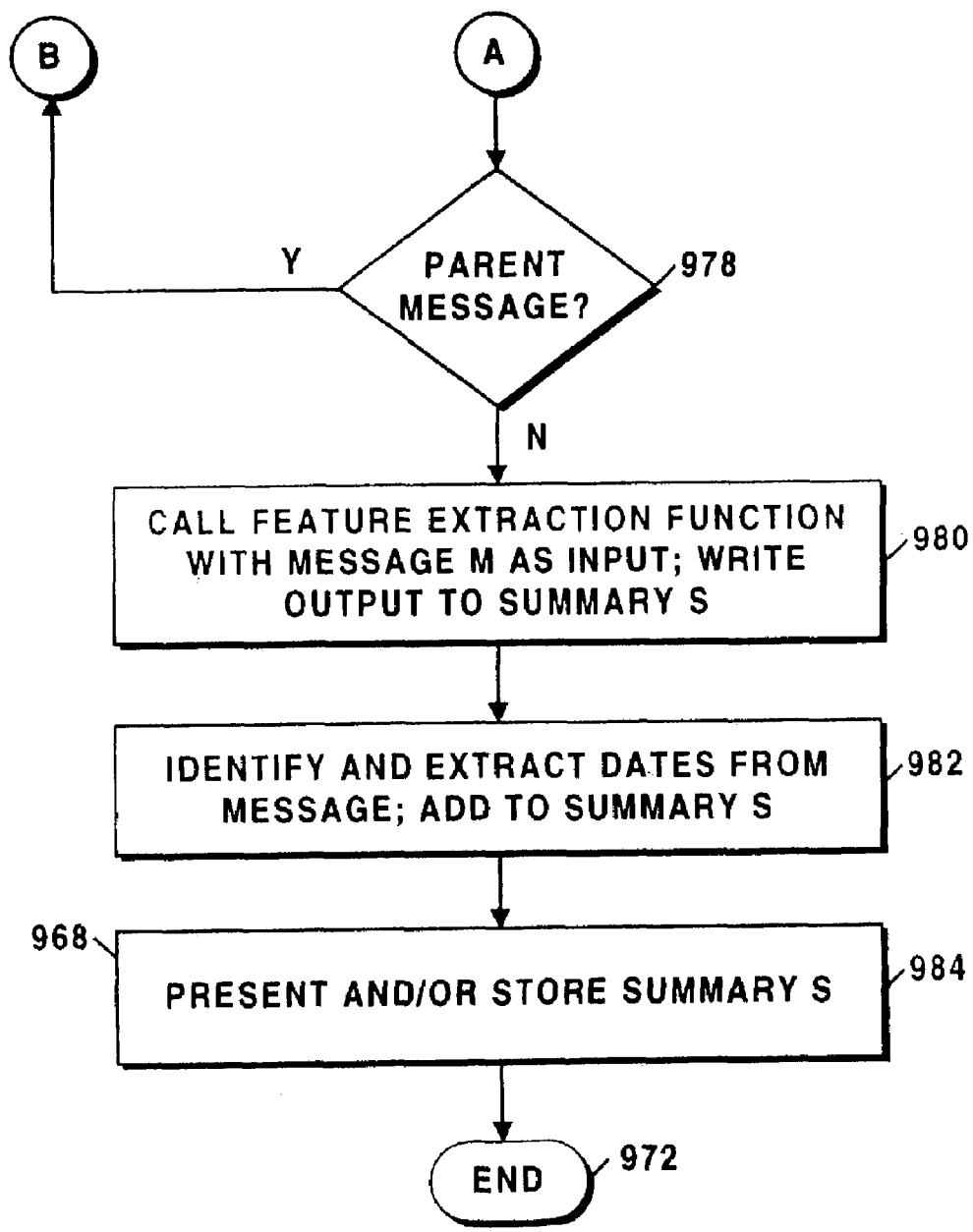

In step 972 of the electronic mail summarization algorithm described with reference to FIGS. 8B-C, text identified as an electronic signature is extracted from electronic mail message body. The inventive process uses various heuristics to identify signatures included in electronic mail messages. Examples of electronic mail signatures include:

| — | | |
|---|---|---|
| John Doe | Thanks, | -William |
| IBM Research | Jane | |
| john_doe@us.ibm.com | | |

Figure 8D:
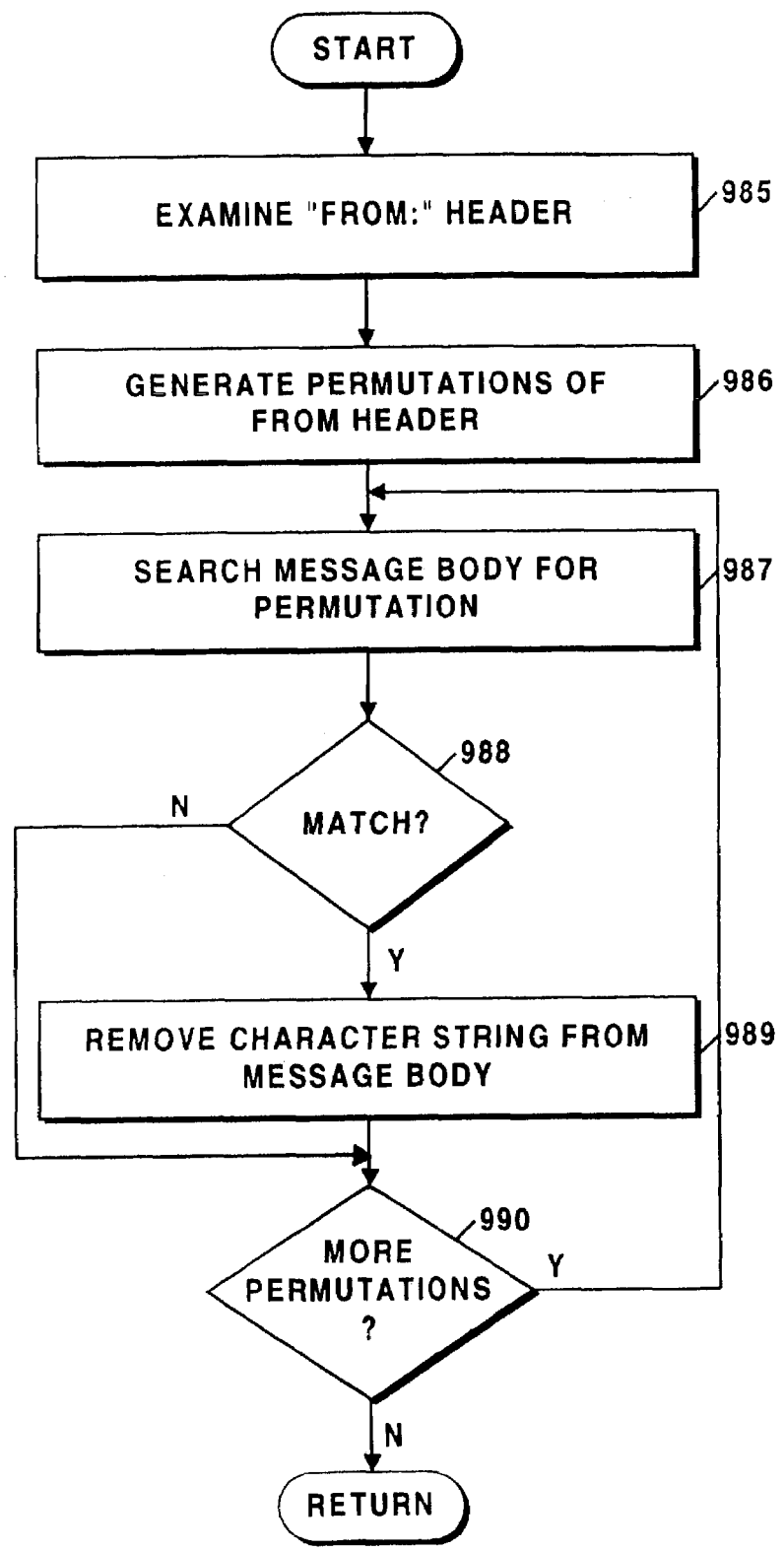
FIG. 8D is a flow chart illustrating the process steps performed during the electronic signature extraction process of the present invention.
Figure 8E:
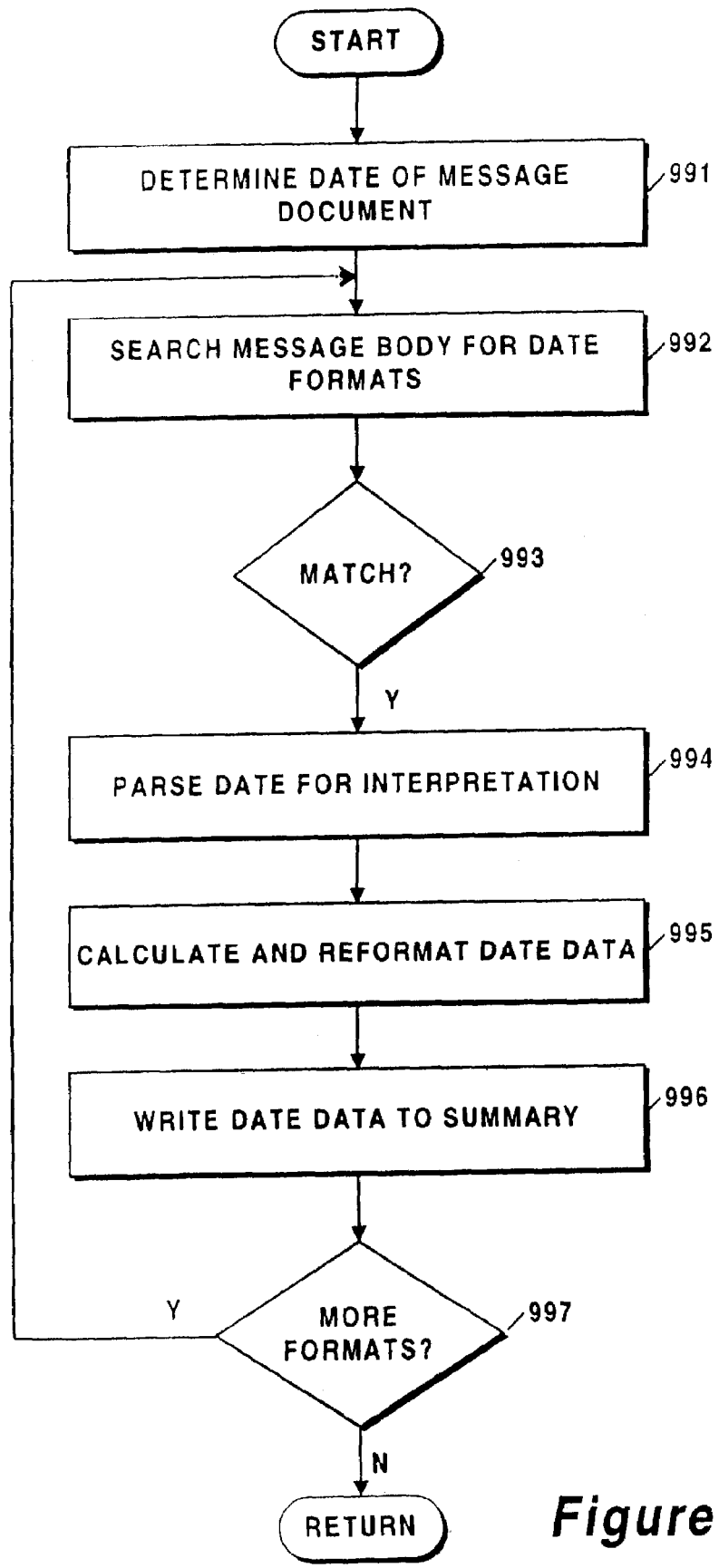
FIG. 8E is a flow chart illustrating the process steps performed during the date data extraction in accordance with the present invention.

The specific processes within electronic mail summarization algorithm for extraction of electronic signatures is set forth in the flowchart of FIG. 8D and described as follows. First, preprocessing module 265 examines the character string in the "From:" header of an electronic mail message m, as illustrated by procedural step 985. Next, preprocessing module 265, generates a list of permutations of the character string, as illustrated by procedural step 986. For example, if the electronic mail message was sent from John Q. Doe, then examples of permutations that would be generated include— John, John Doe,—JQD, and JD. Next, preprocessing module 265 searches the body of the electronic mail message m for those permutations, as illustrated by procedural step 987. If a character string within the body of the electronic mail message m matches one of the permutations from the generated list, as illustrated by decisional steps 1006, preprocessing module 265 removes the character string from the message m, as illustrated by procedural step 989. In the illustrative embodiment, preprocessing module 265 removes the block of text starting from the first signature character before the match and continuing to the next occurrence of two blank lines. Signature characters are characters used to denote the beginning of a signature. Signature characters may include, but are not limited to, "--", "____", "/" or simply a blank line. Given the above example, any signature on the form—John, John Doe,—JQD, or JD would be extracted using the above algorithm. Next, preprocessing module 265 determines if there are more permutations to be compared to the body of the electronic mail message m, as illustrated by procedural step 990. This may be done by maintaining a count of the number of permutations for the current header character string and modifying the count each time the body of the electronic mail message m has been search for one of the permutations. Once all permutations have been searched and no other matches have been found, the body of the electronic mail message m is assumed to be free of any electronic signatures and processing returns to step 974. Alternatively, the body of the electronic mail message m may be assumed to be free of any electronic signatures once a single electronic signature has been found.

Feature Extraction

The inventive system recognizes that there are specific domains in which identifying features, such as names, dates, and company names, product names, becomes useful. In step 980 of FIG. 8C, commercially-available feature extraction software extracts relevant features in documents, including names, numbers, and names of organizations and products. In the illustrative embodiment such functions may be performed by the feature extraction capability in IBM Intelligent Miner for Text, commercially-available from IBM Corporation. It will be obvious to those skilled in the arts that any commercially-available document summarization program and any commercially-available feature extraction program could be used substituted for the IBM Intelligent Miner for Text.

In the contemplated embodiment, the feature extraction function utilized in step 980 of the summarization algorithm can be trained. Pre-training the software enhances recognition when processing new electronic mail messages. Commercially-available document summarization programs include limited learning capacity which enables them to be pre-trained. Such training typically involves processing of several documents with the document summarization module 270 and correction of errors, as well as supplying specific training examples to the program. The inventive system recognizes that features for training these summarization programs can be found in seemingly unrelated repositories, such as electronic address books and buddy lists. Accordingly, the feature extraction software can be pre-trained by aggregating contact data from users' organizer information, including electronic mail inboxes, electronic address books, and buddy lists from Lotus Sametime Connect, the Lotus Sametime client product commercially available from IBM Corporation. After extracting names from users' electronic repositories, these contact data are synthesized into a training document, to train the summarization software to recognize acquaintances listed in the users contact lists. In this manner the extraction function of module 275 can be trained to extract the specific features associated with a particular user.

Date Extraction Algorithm

The summarization of electronic mail messages and threads is one domain in which identified dates become useful, however, some commercially-available feature extraction software does not contain the functionality needed to identify dates in documents. In step 982 of the electronic mail message summarization algorithm described above, dates found in electronic mail messages are identified, extracted and added to the summary. The algorithm to extract these dates from electronic mail message is described below with reference to the flowchart of FIG. 8E as follows. First, preprocessing module 265 determines the date associated with the electronic mail message m, as illustrated by procedural step 991. Next, preprocessing module 265 examines the text body of electronic mail message m searching for any of a plurality of recognized date formats, as illustrated by procedural step 992. To achieve this functionality, preprocessing module 265 attempts to match regular expressions with potential dates. For example, electronic mail messages containing any of the date formats 12-05-01, 05-12-01, Dec. 5, 2001, Dec. 5, '01, 5 Dec. 2001, or, even "tomorrow" if that electronic mail message was sent on Dec. 4, 2001, could be identified in the text body of electronic mail message m using regular expressions. If a character string within the body of the electronic mail message m matches one of the expressions from the plurality of regular expressions, as illustrated by decisional step 993, the character string is parsed to determine its meaning, as illustrated by procedural step 994, and the date calculated and reformatted, as illustrated by procedural step 995. For example, if an electronic mail message received on Dec. 5, 2001 contains the phrase "next Monday at 2," the date extraction function of preprocessing module 265 will process this date/time as Dec. 10, 2001 2:00 PM. Heuristics are used to make this analysis, as well as to fill in missing information for a date/time match, such as the missing AM/PM. Another example of a heuristic for missing information is to assume a date refers to sometime within the next twelve months, if the year is missing.

Next, preprocessing module 265 writes the date data into the summary or a separate document associated with the summary, as illustrated by procedural step 996. Next, preprocessing module 265 determines if there are more regular expression to be compared to the body of the electronic mail message m, as illustrated by procedural step 997. This may be done by maintaining a count of the number of expressions used and modifying the count each time the body of the electronic mail message m has been search for one of the expressions. Once remaining body of the electronic mail message m has been searched and no other matches have been found, the body of the electronic mail message m is assumed to be free of any other date data. The date data found through the date extraction process and stored in conjunction with the summary may be used for searching one's inbox for electronic mail mentioning a certain date, regardless of format.

The present invention also contemplates at least two alternative embodiments of the summarization algorithms described herein. In a first alternative embodiment, each document in a conversation thread is preprocess as previously described and the results appended into a single intermediate document d which is then summarized to provide the summary document s. With this embodiment the size of the summary grows relative to the amount of material being summarized.

According to a second alternative embodiment, only the specified document is preprocessed as previously described and the results appended into a single intermediate document d which is then summarized to provide the summary document s. Such summary document s is likely to be inherently shorter since it was derived from a single document, however, the context of the surrounding document thread is not available included in such summary.

The reader can appreciate that there are alternative ways to maintain and/or compute threads within an electronic mail database, e.g., the use of In-Reply-To headers where a document refers to its parent. The shadow documents disclosed herein provide a complete conversation tree, the way that a discussion database would have complete thread trees. However, the summarization algorithm documents disclosed herein still works in situations where a complete tree is not available or cannot be computed.

Improved Electronic Mail Inbox

Figure 9:
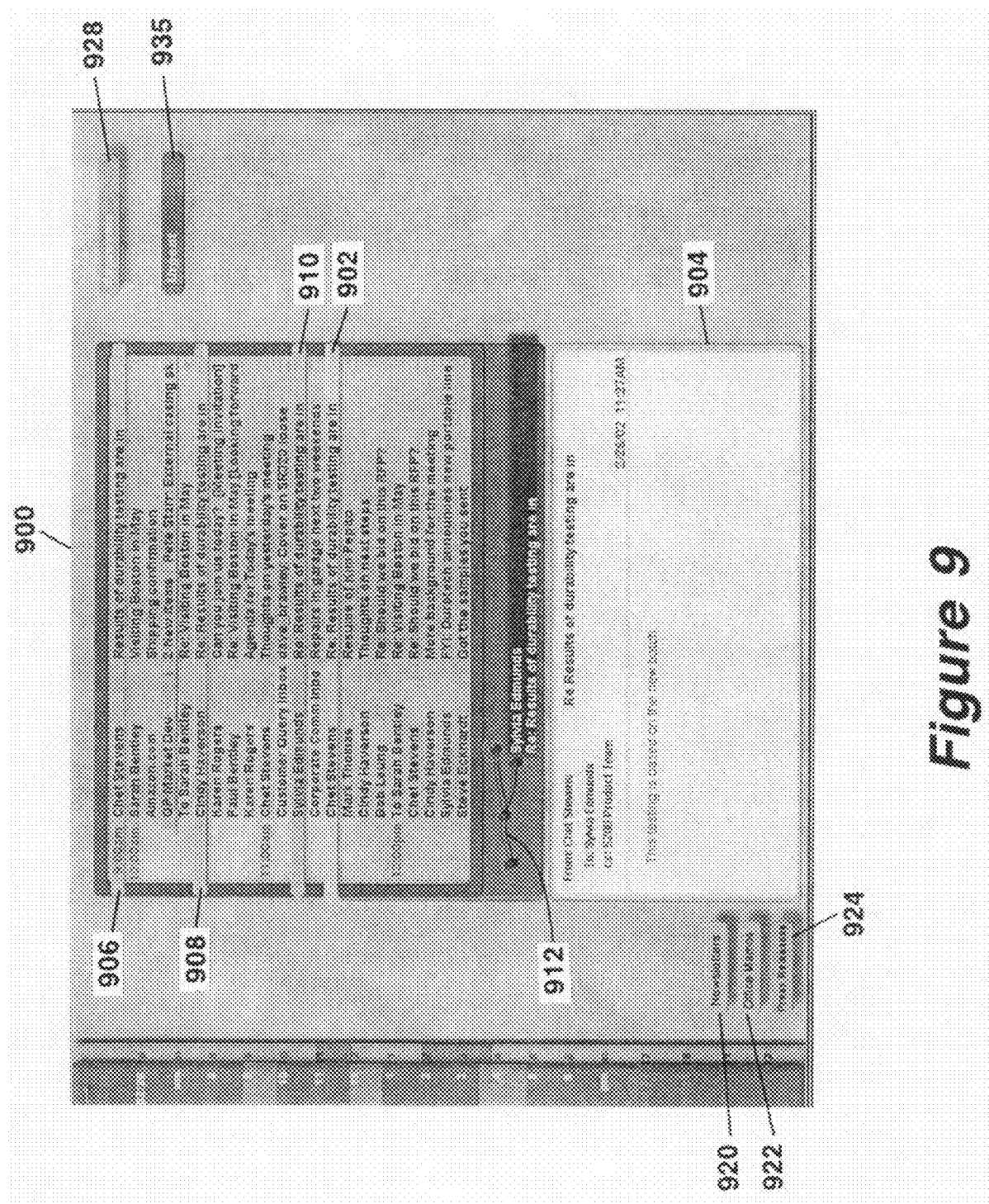
FIG. 9 is a conceptual illustrations of an inbox and various aspects thereof in accordance with the present invention.

The present invention contemplates a new concept electronic mail Inbox 900. As illustrated in FIG. 9, when a message is selected from the main window 901, e.g. a message from Chet Stevens regarding results of durability testing, the message is accessed and a preview 902 of the message 904 is displayed. When a message is selected that is part of a thread, the other items 906-910 in the thread are highlighted in the display, as illustrated in FIG. 9 in which three other electronic mail entries are highlighted. In addition, a map 912 illustrating other messages in the conversation thread—the CCs, the Reply To:s, the forwards, is displayed. Whereas such items were not easily displayable in electronic mail inboxes that have a linear, date centric flow of email, the inbox 900 of the present invention brings all the items related to an activity together in one place and facilitates navigation therethrough.

The preview 902 can be generated using the electronic mail summarization techniques described herein. In addition, the maintenance and tracking of a thread specifically in the form of a file or object can be performed using the shadow document and tree generation techniques described herein. With the inbox 900 of the present invention, it is contemplated that multiple previews of electronic mail may be displayed simultaneously in either separate or overlapping regions of the user interface of inbox 900.

Multiple Source Inbox

Figure 10A:
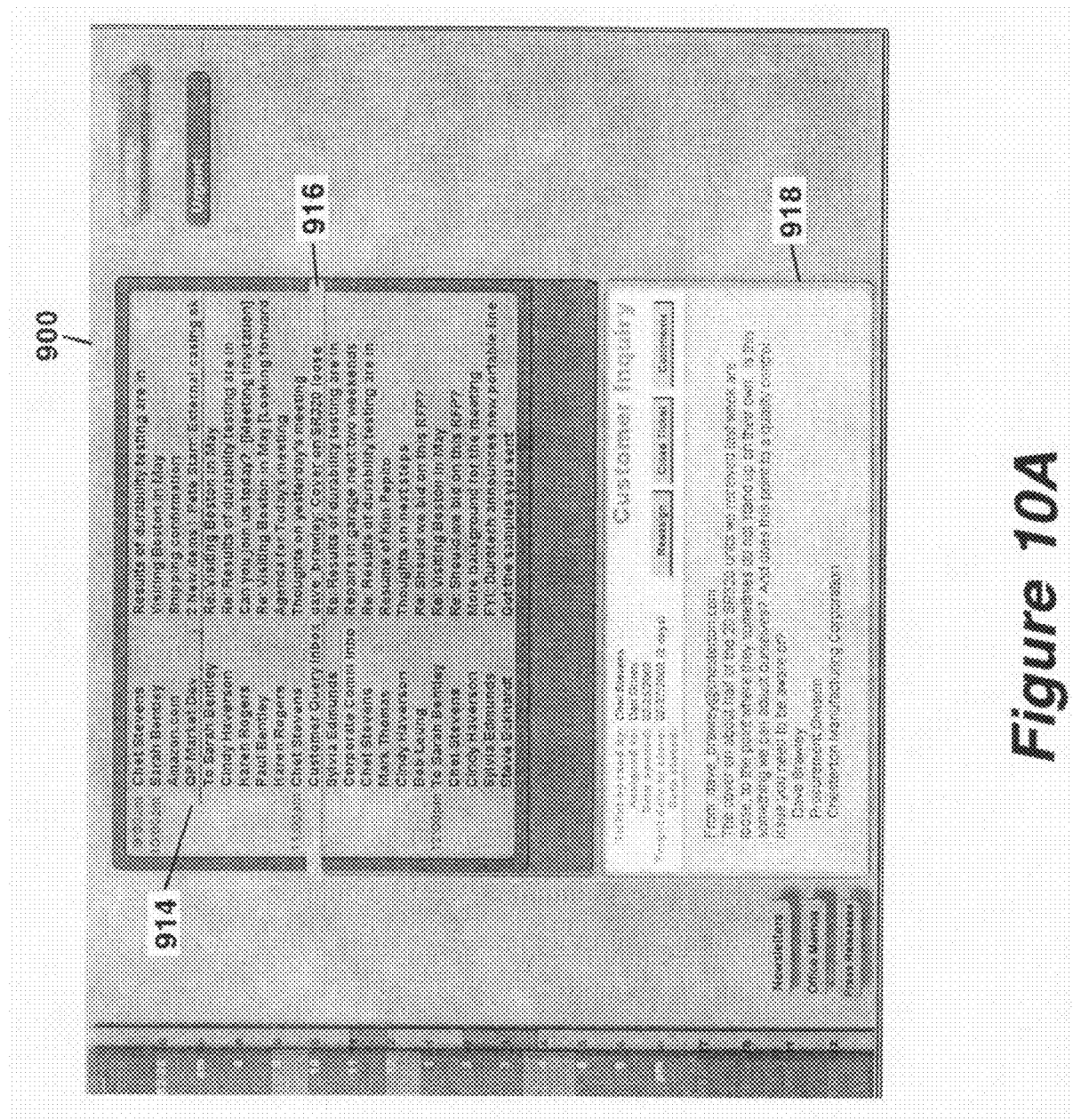
FIG. 10A is conceptual illustrations of an inbox and various aspects thereof in accordance with the present invention.

According to another aspect of the present invention, inbox 900 is capable of receiving not only electronic messages but data and documents from other sources such as databases, templates and other information sources. Studies have shown that people tend to spend significant amounts of time in their inbox. People don't like having to keep checking other databases or outside mail boxes. Inbox 900 in accordance with the present invention, tracks messages in other sources without actually including such information in the inbox 900. Using either the shadow document generation or document summarization techniques described herein, a surrogate document, including any of the size, date, heading information, or summary data and a pointer to the original document data, is generated by Notes Mail Agent 230 and placed in inbox 900. For example, FIG. 10A illustrates an item 916 that had been sent to a Customer Query inbox and flagged there for the users attention. The item 916 includes the surrogate document having text reading "dave_brawley: cover on SR320 loose." This information was derived from the actual original document 918, which in the illustrative embodiment is of the Customer Inquiry format, as described herein, and includes the complete content of the original message document.

Figure 10B:
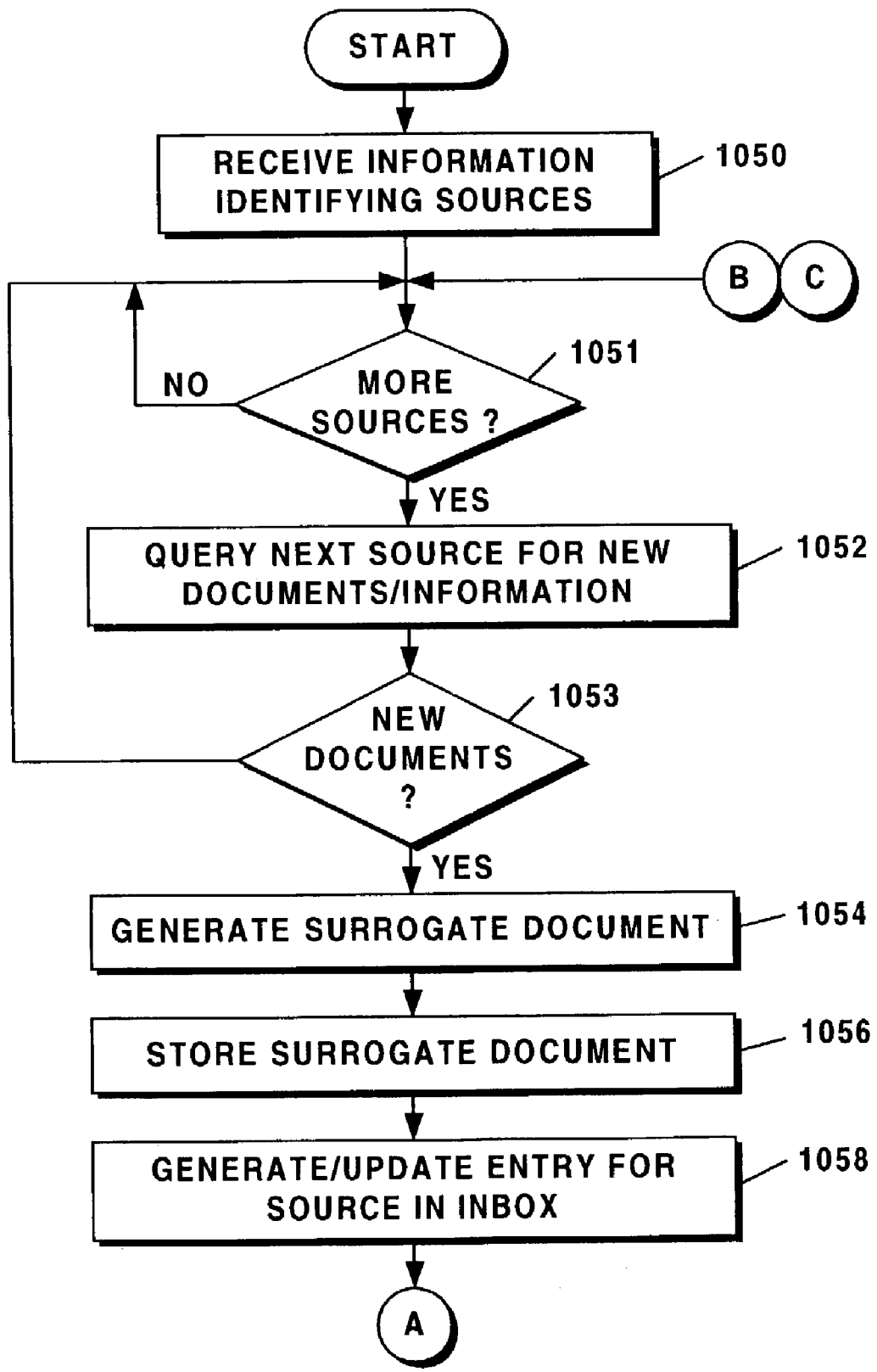
FIGS. 10B-C form a flow chart illustrating the process steps performed in accordance with the present invention.
Figure 10C:
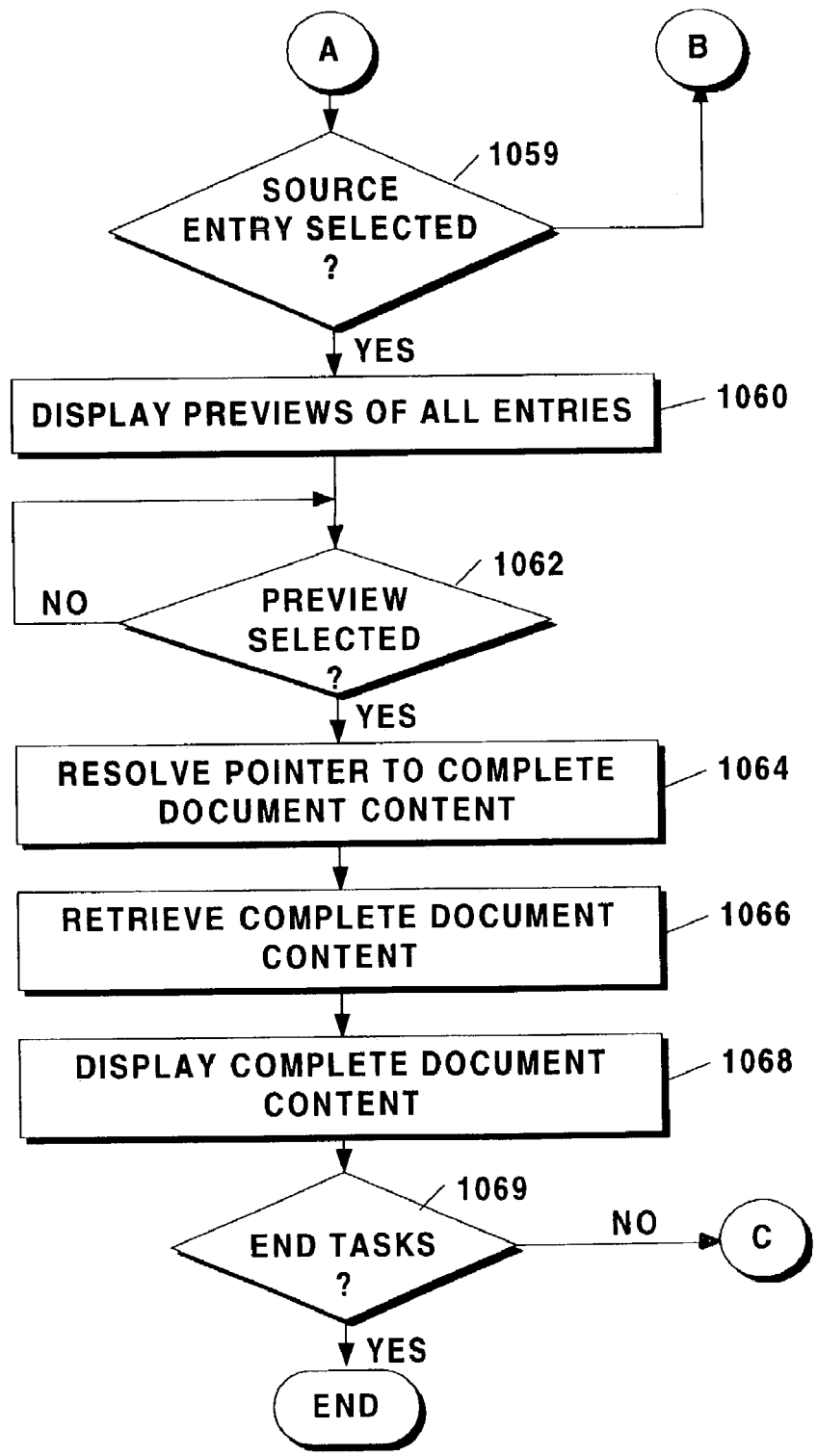

The algorithm used by Mail agent 230 to query other sources of information is illustrated in the flowchart of FIGS. 10B-C and the conceptual diagram of FIG. 10D. In order to implement such functionality, Mail agent 230 receives from a user a list of names and addresses of the databases or other inboxes of information sources 953A-C to be queried, as illustrated by procedural step 1050. Information sources 953A-C may be internal of external to the system on which mail agent 230 is executing. A query algorithm within mail agent 230 periodically accesses a list of the names and addresses of external information sources and queries the same for new data and/or information, as illustrated by decisional step 1051 and procedural step 1052. Mail agent 230 upon receiving data associated with a new document 956 from a source generates a shadow or summary document 951, similar to document 400, in a manner as described herein, as illustrated by decisional step 1053 and procedural step 1054. Thereafter, mail agent 230 stores the summary document in database 955, as illustrated by procedural step 1056, and creates or updates an entry 914 within window 901 of inbox 900, as illustrated by procedural step 1058 and FIG. 10A. Entry 914 in the main electronic mail list of window 901 provides includes the name of the source, here a Quickplace application, a count of the number of unread items associated with the entry and, possibly, a brief heading related to the content of the unread items. Entry 914 is similar, in certain aspects, to Approvals button 928 described herein, with a significant distinction. Entry 914 may move forward or "float" within the main list of inbox 900, each time a new item is received. In this manner, entry 916 will remain reasonably visible within window 901 of inbox 900 if frequent items are generated by the source, e.g. the Quickplace application. The query process repeats indefinitely as long as there are sources on the list, as illustrated by decisional step 1051 loop. Selection of source entry 914 causes preview(s) or brief summary(s) of the data item(s) associated with the entry representing the information source, here a Quickplace session, to be displayed within inbox 900, as illustrated by decisional step 1059 and procedural step 1060. Selection of one of the summary documents from window 901 causes the data pointer therein to be resolved by mail agent 230 to the location of the complete content, as illustrated by decisional step 1062 and procedural step 1064. The complete content of the document is retrieved from its respective memory, as illustrated by procedural step 1066, and displayed within the inbox 901, as illustrated by procedural step 1068. In this manner, inbox 900 becomes the central location for receiving not only electronic mail messages but other sources of useful information. In the illustrative embodiment, the source application may execute on the same or a different system as the users Lotus Notes electronic mail client, in accordance with the embodiments described herein.

In an alternative embodiment of the invention, instead of generating a surrogate document of the complete content of a document, steps 1054 and 1056 may be eliminated and the complete content of the document retrieved and displayed, similar to step 1066 and 1068. Also, although the above embodiments of the invention have been disclosed with reference to database sources of information, it will be apparent to those skilled in the art that other accessible sources of information may be equivalently processed using the inventive techniques and system described herein.

Mail Piles

Figure 11A:
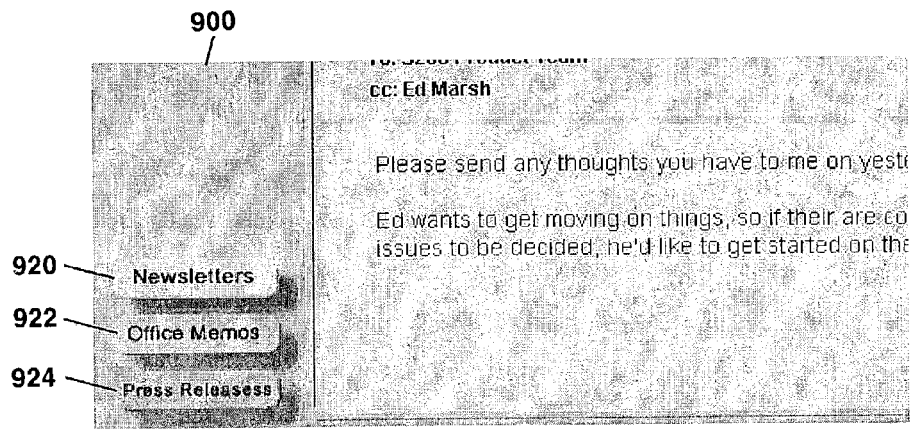
FIG. 11A is conceptual illustrations of an inbox and various aspects thereof in accordance with the present invention.

According to another aspect of the present invention, collections of regularly sent or different priority types of mail sent to inbox 900 can be automatically collected and categorized into any of a plurality of categories, such as approvals, urgent mail, newsletters, memos, and press releases, etc. Multiple viewing options are provided so that the items associated with a category may be viewed separately and/or interleaved with other items in the a main mail inbox. A selected category of items can be accessed via predefined menu topics, such as graphic icon buttons 920-924, as illustrated in FIGS. 9 and 11A. This functionality discriminates between electronic mail that serves as reference material and electronic mail that requires immediate action in a foreground/background juxtaposition format to classify the level of urgency. The less urgent materials are still accessible but without having to interrupt the current users focus on the main list of the inbox 900. With such technique, the viewer is given the ability to view less urgent or different types of received mail separately from a different window, and/or together with all other received mail in the main inbox window, or to toggle between the different presentations.

Figure 11B:
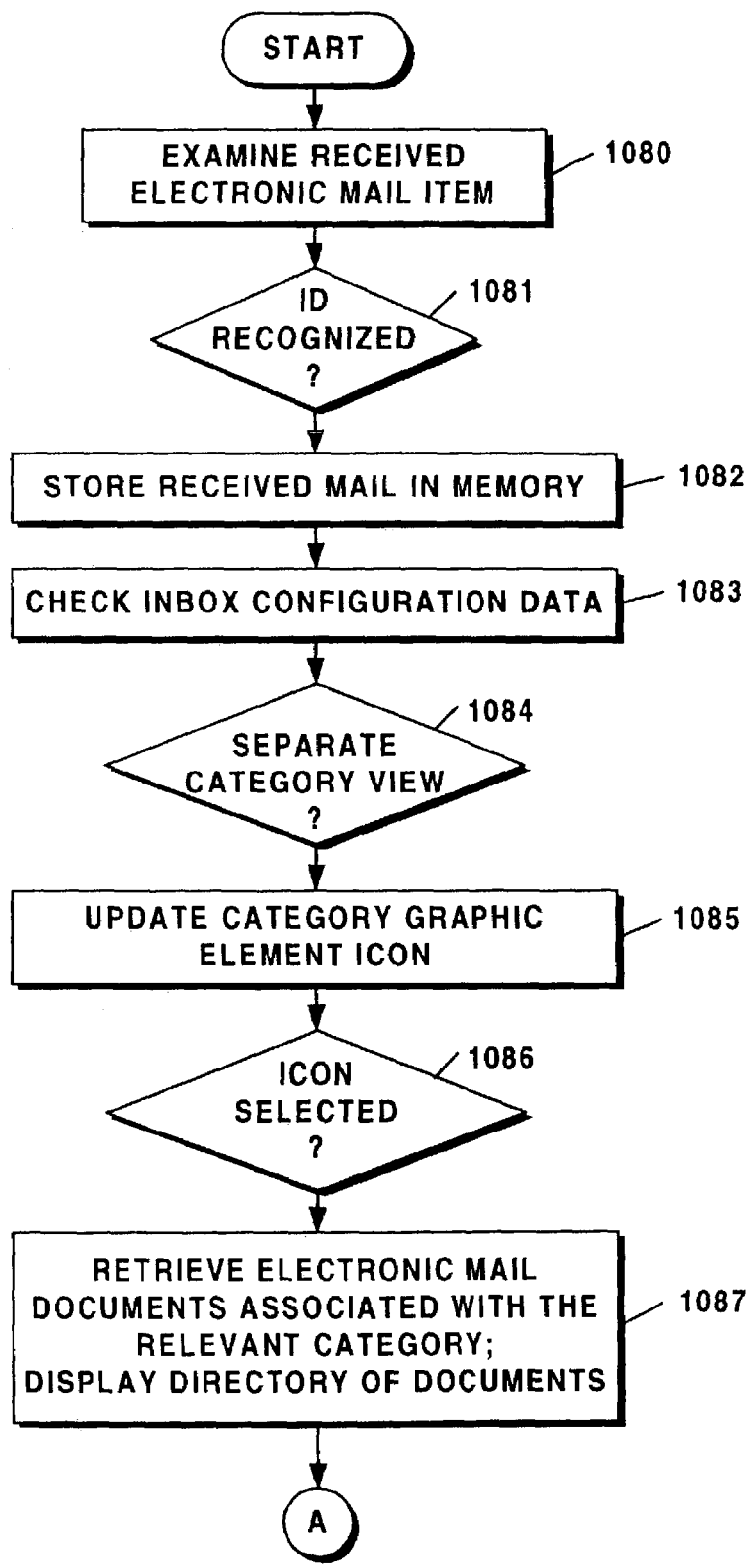
FIGS. 11B-C form a flow chart illustrating the process steps performed in accordance with the present invention.
Figure 11C:
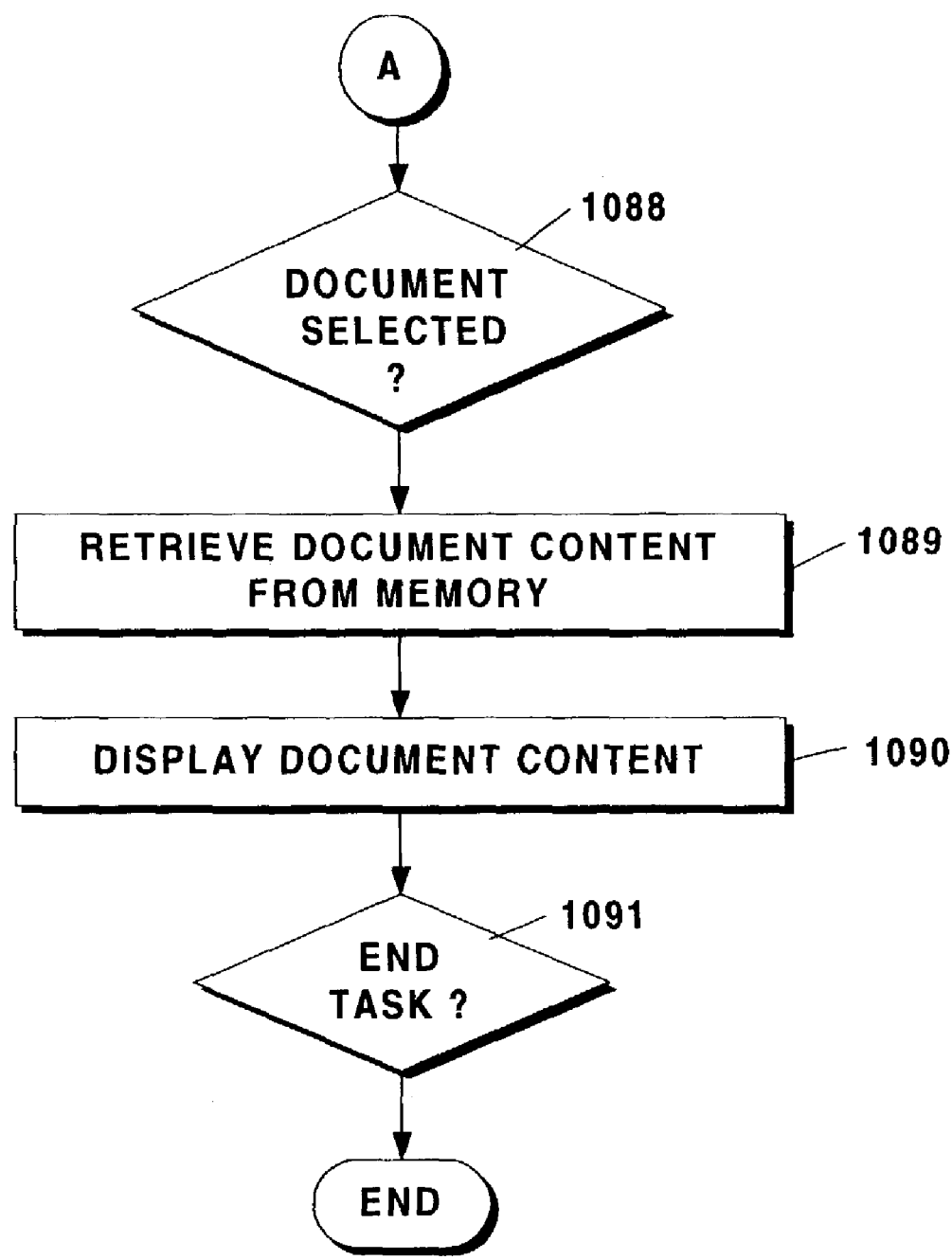
Figure 11D:
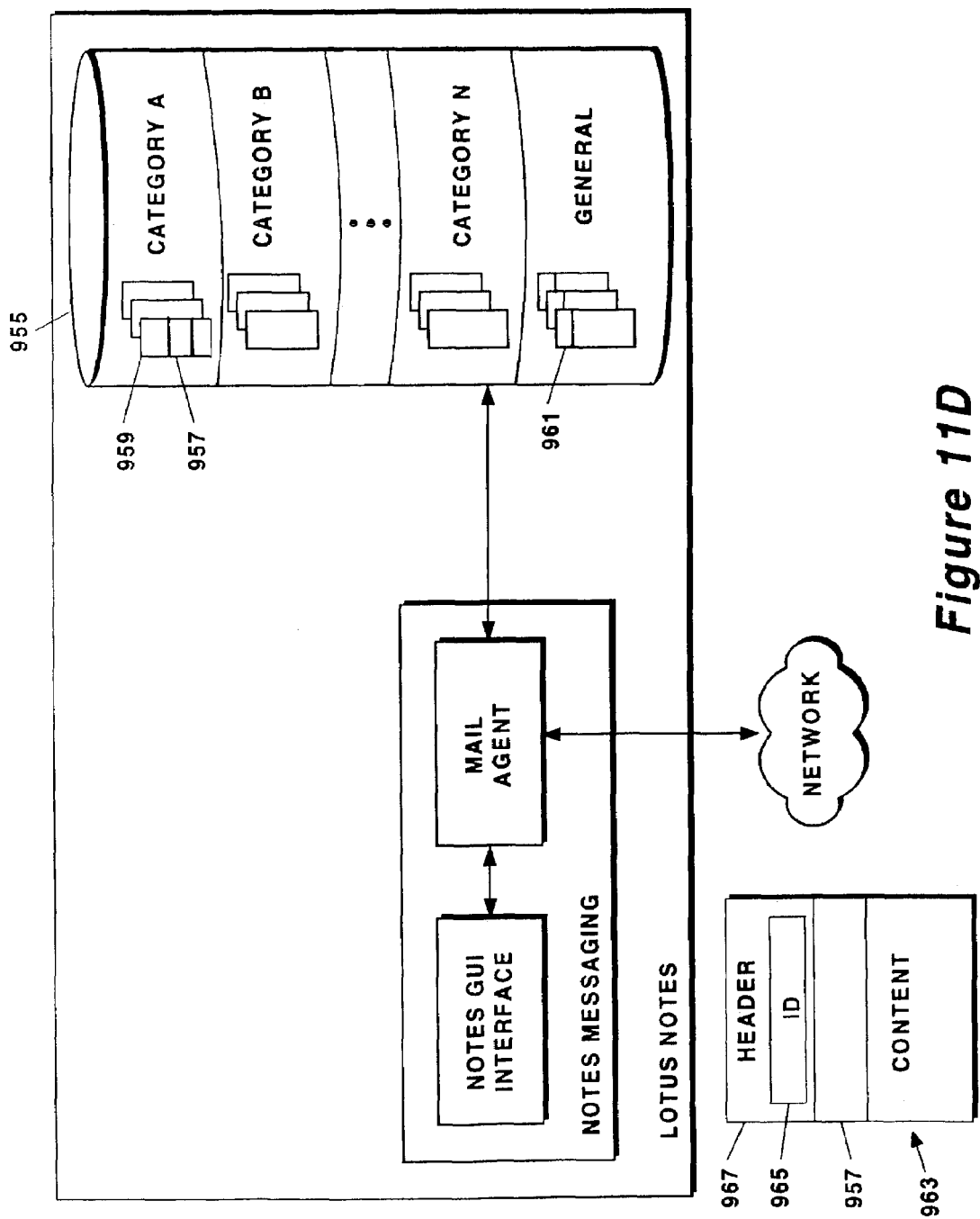
FIG. 11D illustrates conceptually the relationship between the components of the system in which the present invention may be utilized.
Figure 12:
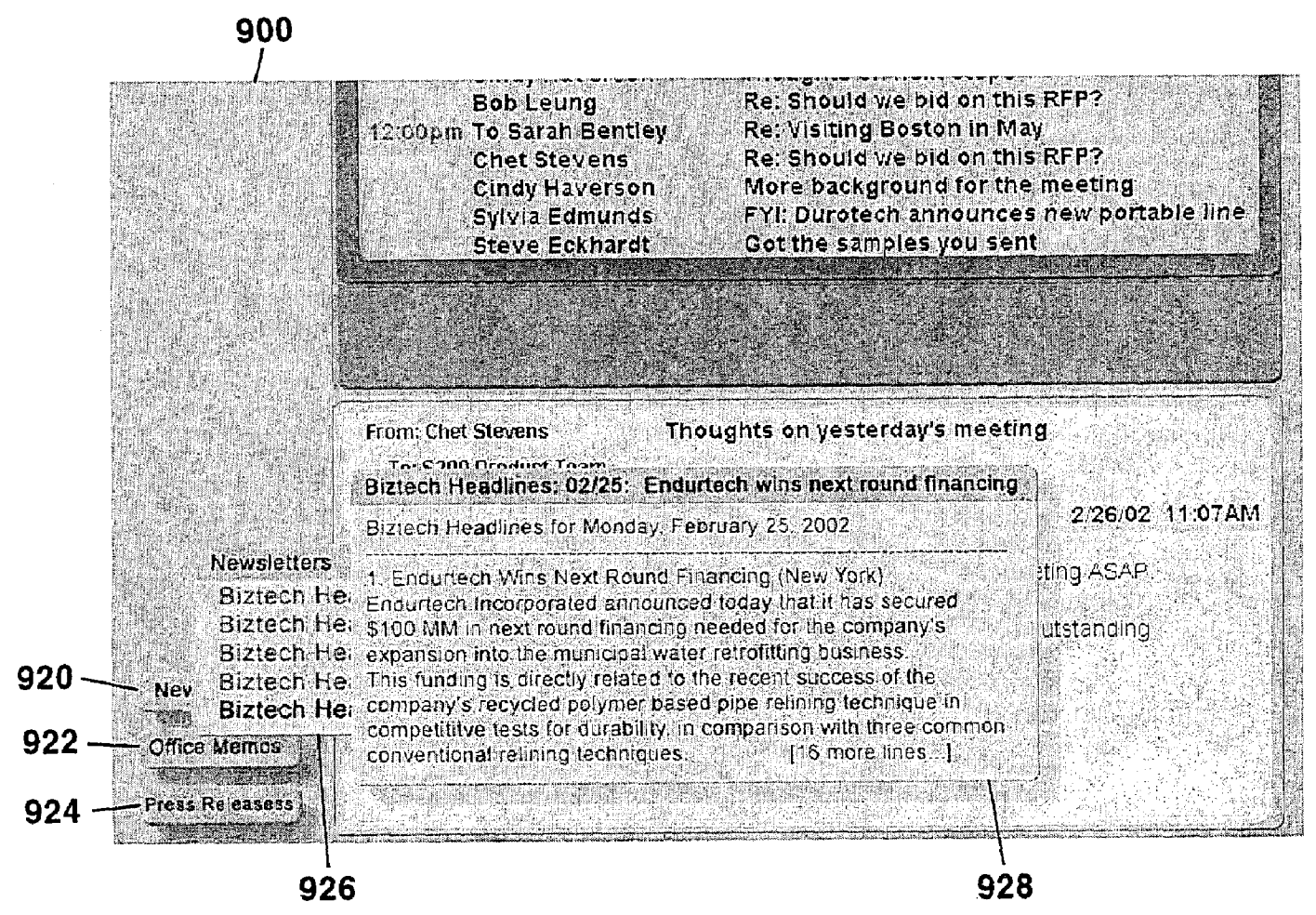

The algorithms used by Mail agent 230 to discriminate between electronic mail and regularly sent lower priority document is illustrated in the flowchart of FIGS. 11B-C and the conceptual diagram of FIG. 11D. Referring to FIGS. 11B-C, an electronic mail document is received by Notes Mail Agent 230 and the header thereof examined, as illustrated by procedural step 1080. In the illustrative embodiment, the received electronic mail document 963 has an identifier 965 in the header 967 thereof which identifies the document as possibly associated with one or more of a plurality of categorie(s). In addition, the identifier may provide a designation of a specific template format recognizable by Notes Mail Agent 230. The template format is useful where the document may have specific data fields, such as the special preview section 957 of the approval requests described hereafter with reference to FIG. 13. Upon recognizing the identifier and/or template, Notes Mail Agent 230 stores the document in either a separate folder or a specific section of mail database 955 associated with a particular category, as illustrated by decisional step 1081 and procedural step 1082. In the illustrative embodiment, an identifier of a specific electronic mail types may be a code, name, keyword, network address, or other source identifier, etc. associated with one of a plurality of categories. Alternatively, Notes Mail Agent 230 may store the document in a general section of mail database 955 with a flag or marker 961 designating the particular category with which it is associated. Messages which do not have any identifier or an unrecognized identifier, may be stored in general folder or a section of mail database 955 associated with general mail. Thereafter, mail agent 230 check to see if the viewer has selected an inbox configuration which enables segregated viewing of the relevant category, as illustrated by procedural steps 1083 and decisional step 1084. If so, mail agent 230 notifies the relevant user interface object(s) for the button icon or other graphic element associated with the specific category to alert the user with either an audio cue and/or a visual notification, such as highlighting the relevant icon button 920, and to adjust the visual display count, if any, associated with the graphic element, as illustrated by procedural step 1085. Referring to FIG. 12 for example, icon button 920 is highlighted to indicate a new item is present and unread.

Selection of the icon button 920 "Newsletters" causes Mail agent 230 to retrieve from either a special or general section of the mail database 955 those received electronic mail documents associated with the category represented by icon button 920 and cause a directory window 926 to be displayed, listing the content headings of the items associated with the selected Newsletters category, as illustrated by decisional step 1086 and procedural step 1087. In the illustrative embodiment, the received items may be ordered chronologically with the newest item highlighted. Selection of one of the document items from the directory listing 926 causes Mail agent 230 to retrieve the complete content of the selected document from mail database 955 and be displayed within the window 929 of inbox 900, as illustrated by decisional step 1088 and procedural steps 1089 and 1090.

If the viewer does not wish to see selected received electronic mail associated with a particular category in a separate window, the viewer may select the relevant icon button and select a close menu option associated therewith, causing the items displayed in the window 929 of inbox 900 to appear in the general mail window 901. Alternatively, upon start-up of the Notes mail client, the user may specify through a configuration dialog screen or with appropriate menu options or commands, which of the categories are to be shown within the main inbox widow 901 and which categories are to be viewable from separate respective windows. In this manner, the viewer may dynamically select which received electronic mail is viewable as a separate category.

In an alternative embodiment, the process steps performed by mail agent 230 are similar to that described above, except that received electronic mail that has no know identifier in the header is summarized by Mail agent 230, using one of the summarization technique described herein, to determine if the document is related to one of the designated topics. This is done by typically searching for keywords, names or addresses in the document during the summarization process and matching these against the list of category identifiers. If Mail agent 230 determines that the received electronic mail is associated with one of the categories, it stores the stores the summary document within the folder or mail database 955, similar to step 1082 along with a pointer to the location of the complete document. Thereafter, a user interface object associated with inbox 900 is notified to alert the user with either an audio cue and/or a visual notification, such as highlighting the relevant icon button 920, similar to step 1084. Further selection of the summary document from window 929 causes the data pointer therein to be resolved and the complete document retrieved and displayed in a window within the inbox 900, similar to similar to step 1088 and as illustrated in FIG. 12. With sophisticated summarization techniques Mail Agent 230 may distinguish documents from the regular sources that have different or unusual formats which may be electronic mail of a more urgent nature. For example, if a topic folder or database is set up for Wall Street Journal Technology Updates, but the document received by the Mail Agent 230 is a request from a Wall Street Journal Technology correspondent for an interview with the user, the summarization process performed by mail agent 230 is sophisticated enough to determine that the document should be placed in the main reader list with the other electronic mail. Such functionality can be obtained with additional pretraining of the preprocessor module 265, feature extraction module 270, and document summarizer 270 with which the Mail Agent 230 interacts during the summarization process. Note that although the document summarization techniques described in the illustrative embodiment can be used to process complete conversation threads, such techniques work equally as well with single documents which are not part any prior conversation thread.

Approval Requests

According to another aspect of the present invention, Inbox 900 provides a special functionality that allows the user to view and take action on classes of similar documents or correspondence which are of a different priority and which the user does not wish to have mingled, and possibly, ignored in the main list of electronic mail. According to this aspect of the present invention, documents that are regularly sent to inbox 900 can be automatically collected and added to or removed from the main list, as desired by the viewer. This functionality discriminates between electronic mail that requires an affirmative action and regular electronic mail correspondence using the techniques described herein to classify the type of action required.

Figure 13:
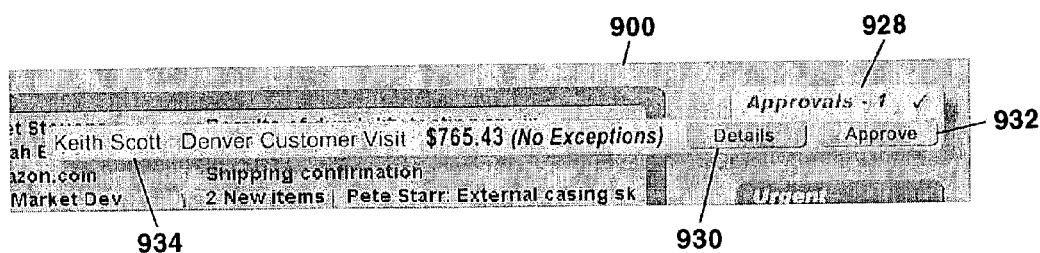

The ability to discriminate between regular electronic mail and an approval request may be performed by Notes Mail Agent 230. Referring to FIGS. 13 and 11B-D, in one embodiment, the user may designate a specific type of action item, here an approval request, by identifier and have a folder or Notes mail database 955 created into which the approval request may be stored until accessed. The Mail agent 230 processes each received item 959, and, if designated approval request, stores either the complete approval request document or a surrogate document, complete with a pointer to the document location, within the folder or mail database 955. Thereafter, a user interface object for inbox 900 is notified to highlight icon button 928, labeled "Approvals", as illustrated in FIG. 13, indicating that an approval request item has been received. In addition, a graphic representation of the number of items collected in the Notes database 955 for the particular category of action item may be displayed on icon button 928 so that the user may access such items once a sufficient quantity has accumulated. The value of an item count variable may be maintained in Notes database 955 by mail agent 230, and may be incremented or decremented whenever an action item is received or deleted, respectively.

Referring to FIG. 11D, a request item 959 as prepared by a sender of the item may include a special preview section 957 containing the pertinent data for the request. Such special preview section 957 may be implemented in XML format. In the example illustrated in FIG. 13, since the action item is an approval request, the special preview section 957 comprises the name of the requester, the main subject of the request, an amount to be approved, and an indication that there are no exceptions. In order to create such an action item, the Mail Agent 230 on the requestor's system may supply the requester with a template into which the relevant data may be entered. Such template may be either embedded as part of the electronic mail item or attached to the electronic mail item. The request is then transmitted over the network to the receiver's system.

Upon receipt of the action item by the Mail Agent 230 on the receiver's, system, Notes Mail Agent 230 recognizes the identifier associated with the message header as an approval request action item and stores the item in the Notes mail database 955 and increments the item count variable displayable as part of icon button 928, in a manner as previously described with reference to FIGS. 11B-C. The approval request may then be presented in either the general inbox or as selected through icon button 928. Selection of the icon button 928 causes mail agent 230 to retrieve the special preview section 957 for the approval request action item stored in Notes mail database 955. The preview section 957 item is displayed in window 934, including the name of the requestor, and a brief description of the request. In the illustrative embodiment, the request is for a expense account expenditure and includes brief description of the expenditure, the amount and a notation that there are no exceptions. Also included in window 934 are an Approval icon buttons 932 and a Detail button 930, respectively. Selection of Approval icon button 932 causes: 1) the requests to be approved; 2) a user definable message sent to the requesting sender notifying of the approval; 3) deletion of the approval request from related folder or Notes mail database 955; and/or 4) decrementing of any item count displayed as part of icon button 928. If the user has questions about the approval request, the Detail icon button 930 can be selected and all or a greater portion of the content of the approval request item may be displayed in a separate window on inbox 900. In the illustrative embodiment, the complete data of the approval request item may be displayed within the inbox 900, or, as described above, a surrogate or summary document, including a pointer, may be presented and resolved into the actual approval request content upon selection thereof. Such summary may be generated using the techniques described herein.

Although the various exemplary embodiments of the invention have been disclosed with reference to approval requests it will be apparent to those skilled in the art that various other categories of messages that require some kind of affirmative action by the viewer may be equivalently processed using the inventive techniques and system described herein.

Urgent Mail

According to another aspect of the present invention, Inbox 900 provides a special functionality that allows the user to view and take action on classes of similar documents or correspondence which are of a higher priority and which the user may not wish to have mingled, and possibly, ignored in the main list of electronic mail. Urgent documents sent to inbox 900 can be automatically collected and removed from the main list. Instead, such items can be accessed via a menu option associated with a predefined category, such as icon button 935 labeled "Urgent", as illustrated in FIG. 9. This functionality discriminates between electronic mail that requires an urgent attention and regular electronic mail correspondence in a foreground/background juxtaposition format to classify the type of action required.

The ability to discriminate between regular electronic mail and an urgent mail may be performed by Notes Mail Agent 230. Specifically, a the user may designate specific electronic mail types by name, keywords or senders as "Urgent" and have a folder or Notes mail database created into which these urgent documents may be stored until accessed. The Mail agent 230 processes each received item and, if designated urgent by the sender or matching the user defined criteria, stores either the complete document or a surrogate document, complete with a pointer to the complete document location or content within the folder or mail database. In the illustrative embodiment, icon button 935 is highlighted to indicate a new item is present and requires action. In addition, the number of items collected may be displayed on icon button 935 so that the user may access such items once they have accumulated to a sufficient quantity. In the illustrative embodiment, the urgent document itself may be displayed within the inbox 900, or, as described above, a surrogate document having a pointer associated therewith may be presented and resolved into the actual document content upon selection thereof.

Calendar Bar

Another premise of the invention is to have a calendar function that is capable of displaying two or more calendars simultaneously while viewing an electronic mail inbox and that can be written to or accessed by other applications. As with the other aspects of the invention, although the concepts of the present invention may be equally applied to other applications, the illustrative embodiment will be described with reference to a Lotus Notes environment described herein.

Figure 14A:
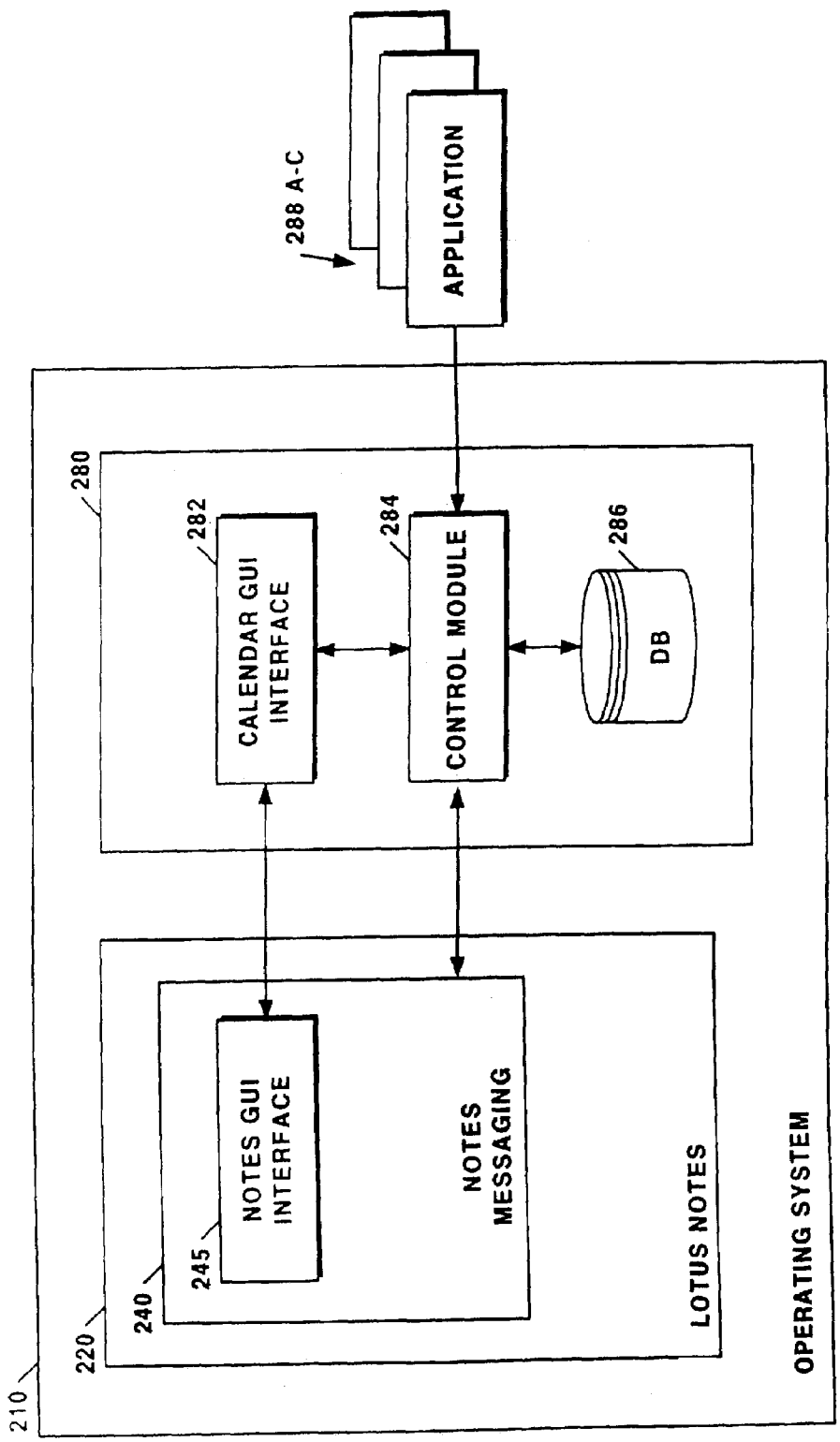
FIG. 14A illustrates conceptually the relationship between the components of the calendar bar utility and the system in which the present invention may be utilized.
Figure 15A:
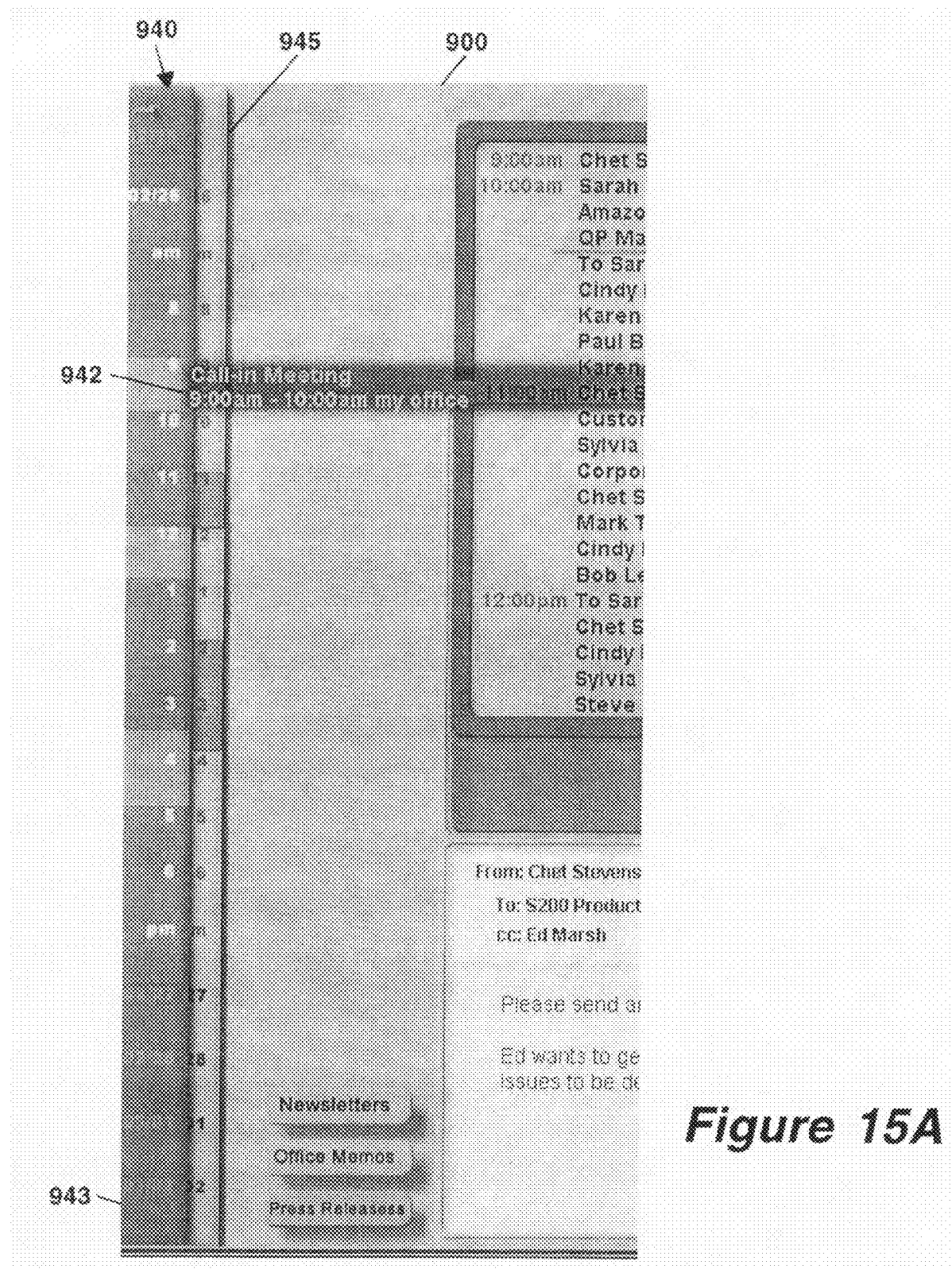
FIGS. 15A-B are conceptual illustrations of the user interface of a calendar bar in accordance with the present invention.
Figure 15B:
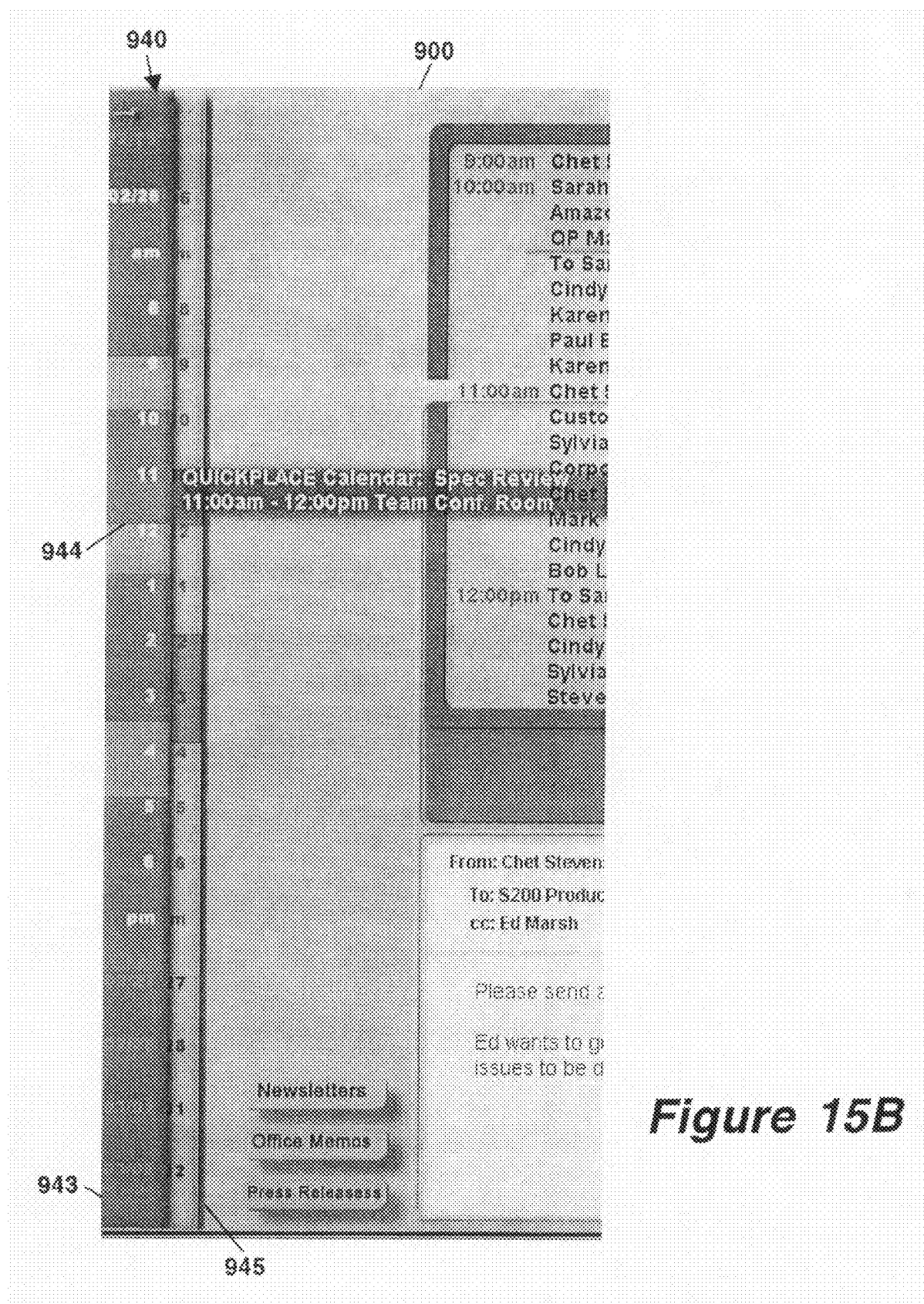

FIG. 14A illustrates conceptually the relationship between calendar utility 280 and the Notes application 220 and other applications 288A-C with which calendar utility 280 operates. Calendar utility 280 comprises a calendar GUI module 282, control module 284 and a database 286. In the illustrative embodiment, calendar utility 280 may be implemented in an object-oriented programming language such as C++. Accordingly, the data structures and functionality use to achieve the functions described herein may be implemented with objects or groups of objects. Calendar GUI module 282 interacts with control module 284, database 286 and, in the illustrative embodiment, Messaging GUI module 245, and functions to render the bar-like format of one or more calendars and to display different level for time periods selected by a user, as illustrated in FIGS. 15A-B. Control module 284 interacts with calendar GUI module 282, database 286, and other application 288A-B. Control module 284 functions to control the receipt and access of data to/from database 286 and to coordinate the supply of information to calendar GUI module 282. Database 286 interacts with control module 284 store graphic and other information associated with a specific defined time period of a specific calendar. In the illustrative embodiment, database 286 contains records for each time periods defined by each a the calendars maintained thereon. Note that database 286 may retain the data for a plurality of user and team calendars, public or private within the same database. The number of viewable calendars maintainable by database 286 may be limited only by the size of the database or databases. Note that database 286 may be implemented in a distributed manner across a plurality of databases or in a manner similar to database 350 of FIG. 3. The records of database 286 can be accessed from and written to by other application, besides Lotus Notes.

The Notes application 220 includes a Notes messaging module 240. Included within the Notes messaging module 240 are a Messaging GUI module 245. Messaging GUI module 245 is responsible for rendering the visual display of an inbox 900 described herein. Messaging GUI module 245 interacts with the Notes application and the operating system 210 in order to achieve the proper windowing and rendering of graphic data using techniques know in the relevant arts.

Calendar bar utility 280 interacts with Notes messaging module 240 and Messaging GUI module 245 in a similar manner as current commercially available Notes products. In particular, an application, such as Notes 220, specifically the Notes messaging module 240, calls the calendar utility 280 through an Application Programming Interface (API) to display calendar data typically during the viewing of the an electronic mail inbox. The calendar GUI module 284 renders the relevant calendar and any information associated with a specific entry utilizing one or more records within database 286.

Calendar bar utility 280 is typically invoked by the opening of the mail viewer inbox in 900 for a particular user. In the first illustrative embodiment calendar bar utility 280 may reside within or on the same system as the Lotus Notes client, as illustrated in FIG. 14A, or, alternatively on a Lotus Notes "Domino" server. Alternatively, in a second illustrative embodiment described herein, calendar bar utility 280 may be a stand alone application the is accessible by other applications separate and apart from Lotus Notes.

Figure 14B:
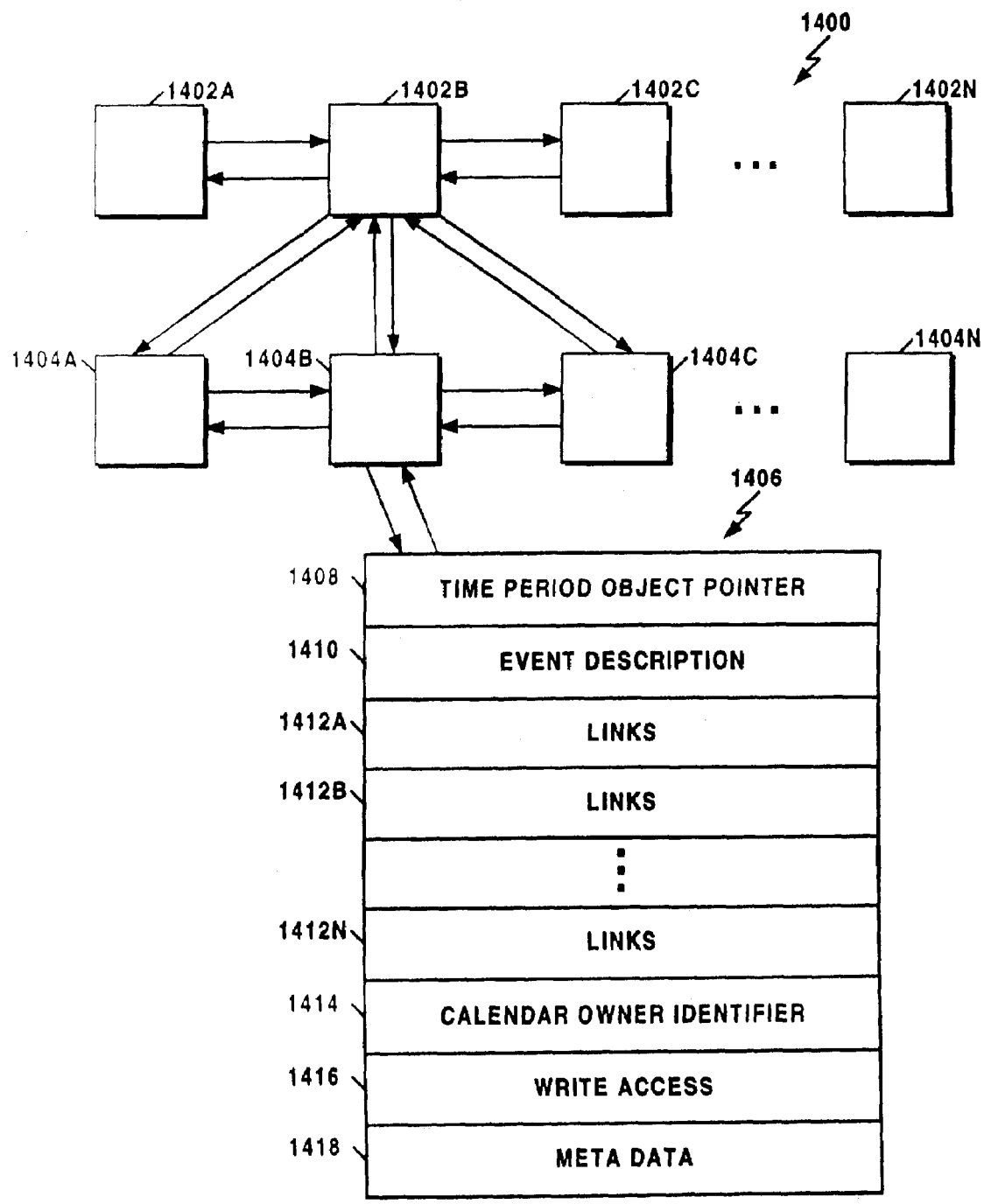
FIG. 14B illustrates conceptually the architecture and the data structures utilized to implement the calendar bar utility in accordance with an embodiment of the present invention.

Referring to FIG. 14B, within database 286 a calendar 1400 may be virtually maintained as a set of doubly linked lists of time period objects that reference each other, typically with pointers, on the same level, i.e. a time period object representing a day includes links to other time period objects representing the prior day and the next day. In addition, time period objects include links to other time period object on different levels, i.e. a time period object representing a day includes links to the time period object representing the month to which the day belongs as well as links to the time period objects representing each increment of the day, typically hours, into which the day may be further subdivided. Note that a time period object pointer may have a null value if the subject object is at the root level of the calendar organizational hierarchy, i.e. a month or year representation, depending on the implementation. In this manner, a virtual model for a calendar can be used as the basis for all calendars, with only the unique information associated with a viewer's particular calendar having to be stored and maintained in the database 286.

FIG. 14B illustrates conceptually a linked listed calendar model 1400 comprising a plurality of linked lists 1402A-N and 1404A-N, and an exemplary data structure 1406 that may be use to store the information associated with one of the selectable defined time period. The information in the record is defined by the user or by other applications and is displayed upon selection of the time period. Record 1406 comprises an Time Period Identifier (ID) 1408, an Event Description field 1410, Links 1412A-N to other sources of information, Calendar Owner Identifier 1414, Write Access field 1416, and an optional Meta Data fields 1418. Time Period Object Identifier 1408 and, Links 1412A-N may comprise a pointer to a record or other document, such as an original electronic mail document, a shadow document of an electronic mail document, a summary document of an electronic mail document, a summary document of an electronic mail document conversation thread, or the root of the conversation thread tree, whether shadow or original. The techniques necessary for constructing conversation threads, summaries and shadow documents from original electronic mail documents are described herein. In the illustrative embodiment, the data associated with an event, typically a meeting, in the Event Description field 1410 may vary in detail and scope depending on the designer preferences, but will typically include the start and end times, the location, topic, type, i.e. call-in, video conference, etc., participants, relevant telephone numbers, network addresses, and/or references to relevant data and materials for the event. This field may be implemented with a n characters, where n is an integer value left to the designer's discretion, e.g. 256 characters. Any of the above items may be displayed in window 942, as illustrated in FIG. 15A. In the illustrative embodiment, the meta data may include such logistical information as sender, receiver, original size, subject, date, any carbon copy recipients, etc. associated with the document. Write Access filed 1416 may define typically with a bit map, whether write access to record fields 1410-1412 is allowed, who may write to such fileds and the types of applications allowed to writ to such fields, e.g. Lotus Notes, Quickplace, Sametime, or Intelligent Miner, etc.

Note in the present invention that a record, such as that shown in FIG. 14B, may be associated with not only the lowest level time period, e.g. hours of a day, but may also be associated with any other higher level defined time period object within the virtual model of the calendar, e.g. a time period object representing a day or month may have its own different record associated therewith.

Referring to FIG. 15A, calendar bar 940 provides a means for conveniently displaying calendars 943 and 945 while viewing electronic mail. The calendar bar 940 is displayed simultaneously with the main electronic mail list in inbox 900, as illustrated. The calendars 943 and 945 of calendar bar 940, in the illustrative embodiment, is arranged vertically and displays a chronological legend for multiple days, and, upon selection of a date, or the current date, increments of time. In the illustrative embodiment of the invention, multiple calendars are viewable at the same time with minimal use of area on the interface. For example, upon invocation, calendar bar utility 940 may present the personal calendar of the user simultaneously with the team calendar of the team to which the user belongs. As shown in FIG. 15A, the calendar bar may show the day divided into hours, however, it will be obvious to those reasonably skilled in the arts that other increments of time, whether smaller or larger, may be displayed. For example the calendar may at a high level display months. Upon selection of a specific a month a chronological legend for multiple days may appear. Upon selection of a specific a day, a chronological legend of hours may appear. Upon selection of specific time, typically by hovering over or selecting the region designated to a specific time slot with the cursor of a pointing device, the data within the Event Description field of the record associated with the time period is displayed on the user interface, typically next to the defined time slot, as illustrated by region 942, or, alternatively, in a separate window.

With the inventive inbox 900 of the present invention, calendar 940 may be seemlessly integrated with various other entities within the inbox 900. More particularly, calendar bar 940 may, according to another illustrative embodiment, be linked to other applications such as Lotus Quickplace or Lotus Sametime, commercially available from IBM Corporation, Armonk, N.Y. The Quickplace product provides a web-based user interface to Domino, also commercially-available from IBM Corporation. The Domino product provides a web-based user interface to Lotus Notes, also commercially available from IBM Corporation. Quickplace enables multiple users to interact collaboratively in virtual spaces or meeting rooms and allows multiple users or teams to have calendars associated with a specific team or room. As illustrated in FIG. 15B, calendar bar 940 may be configured to show calendar entries from Quickplace, specifically a Quickplace to which the user is a member, as well as the calendars of other Quickplace teams, using appropriate links. In FIG. 15B, a window 944 may be displayed and contain information similar to that of window 942 of FIG. 15A. To allow other applications 288A-C to update database 286, the applications use an API call to the calendar bar utility 940 requesting access to write to a record 1406 associated with a specific time period object and user. If access is granted, the application transmits the information to be written to the record or linking data that can be later resolve to another source of the information.

Figure 14C:
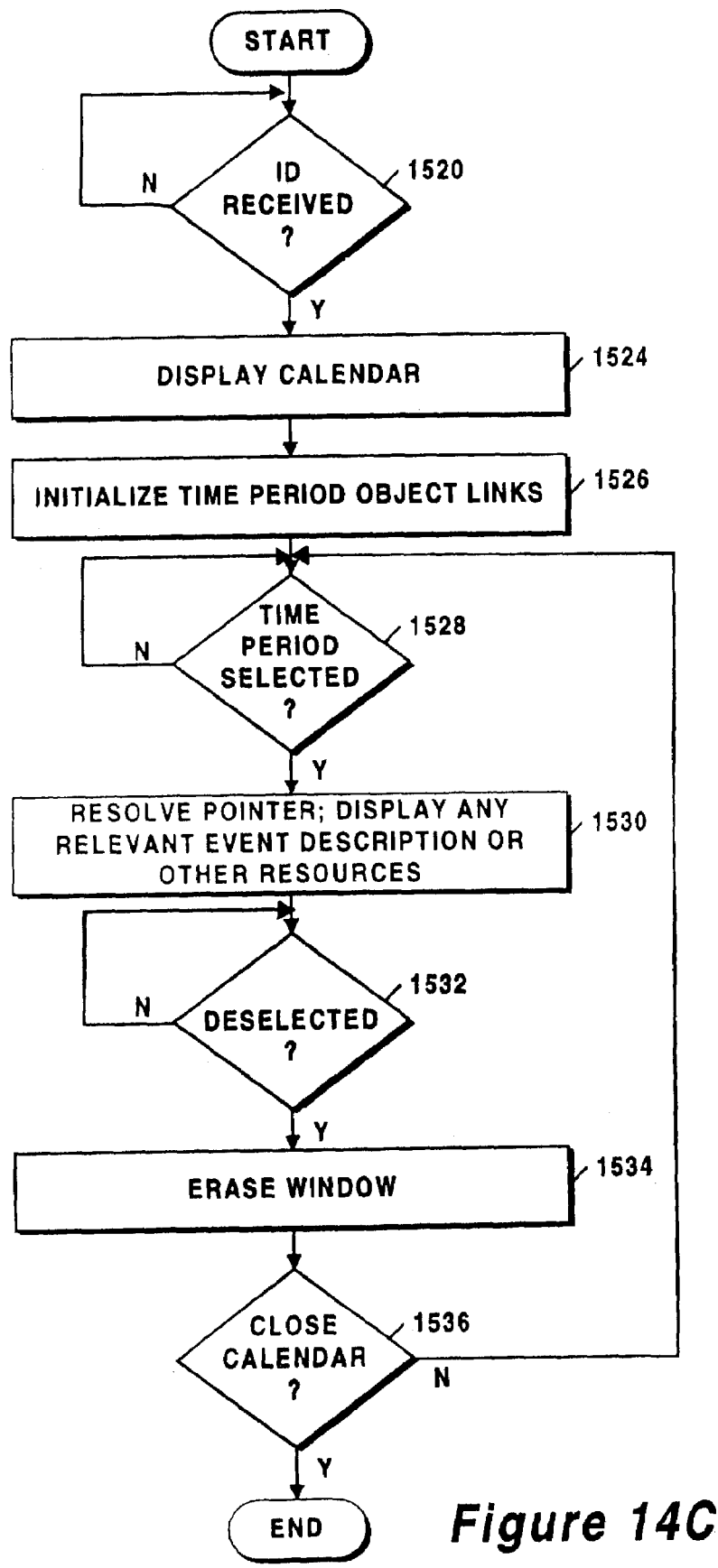
FIG. 14C is a flow chart illustrating the process steps performed during rendering the calendar bar interface in accordance with the present invention.

The algorithm performed by control module 284 during the display and retrieval of data from database 286 and display through the Calendar GUI 282 is described below with reference to the flowcharts of FIG. 14C. Upon any of selection of a specific calendar tab, entry of a command or simply opening of inbox 900, control module 280 initiates calendar bar utility 940, as illustrated by procedural step 1520. Upon initiation, calendar bar utility 280 waits to receive data identifying the current user, as illustrated by decisional step 1520. Such identifier, in the illustrative embodiment, is provided by the Notes messaging module 240 to control module 280. Alternatively, in a stand alone embodiment, the user may provide such identifier directly to calendar bar utility 280. Control module 280 uses the identifier as a reference handle into the database 286 and located the field 1414 that matches the identifier. Control module 280 the causes calendar GUI module 284, in conjunction with Notes GUI module 245, to render a graphic calendar bar 943, as illustrated by procedural step 1524, and to initialized the pointers/links 1408 to all the relevant records 1406 associated with the particular user's calendar, as illustrated by procedural steps 1526. Next, control module 280, via calendar GUI module 284, waits for data identifying a time period object, as illustrated by decisional step 1528. Control module 280 then resolves the pointer to the relevant time period object, retrieves the event description field 1410 data associated with the specific record and forwards the information to calendar GUI module 284 for rendering on the user interface, as illustrated by procedural steps 1530. In addition, control module 280 then resolves any pointer/links 1412A-N and causes the associated descriptions therefrom to be similarly rendered. Next, if the selected time period is deselected or if another time period from the calendar bar 943 is selected, the prior description is erased, as illustrated by decisional step 1532 and procedural step 1534. If the calendar bar utility 940 is terminated, the process ends. Otherwise, the process returns to before step 1528 and awaits for additional selections of time periods from the calendar bar 943. The process repeat upon initialization for any additional calendars also identified in step 1520, e.g. calendar 945. As illustrated in FIGS. 15A-B calendars 943 and 945 may be rendered in an overlapping manner with the currently selected calendar in the foreground and all other calendars in the background.

The algorithm performed by control module 284 during the display and retrieval of data from database 286 and display through the Calendar GUI 282 as described above is similar for a stand alone implementation of the calendar bar utility 940 that is not implemented within a Notes environment or another electronic mail application. Although the various exemplary embodiments of the inventive calendar bar utility have been described for use with an electronic mail application, such calendar bar utility may interact with or be displayed simultaneously with any application or alone without effecting the functionality of the invention.

Quickplace

Figure 16:
FIG. 16 is a conceptual illustration of the user interface in accordance with the present invention.

In addition, Quickplace may interact with inbox 900, as illustrated in FIG. 16. As illustrated, an entry 946 in the main electronic mail list provides updates relevant to the latest Quickplace activities for the user. As illustrated, entry 946 may include the name of the Quickplace, a count of the number of unread items associated with the Quickplace entry and, possibly, a brief heading related to the content of the unread items. Selection of Quickplace entry 946 causes a preview or brief summary of the Quickplace data item to be displayed within inbox 900. Summarization of the Quickplace items may be made using the algorithms similar to those described herein with reference to summarization of electronic mail and conversation threads. In addition, the user may be provided with a selectable graphic entity from either Quickplace entry 946 or an item preview contained therein to launch the actual Quickplace application from inbox 900.

Quickplace entry 946 is similar, in certain aspects, to Approvals button 928, with a significant distinction. Quickplace entry 946 may move forward or "float" within the main list of inbox 900, each time a new Quickplace item is received. In this manner, Quickplace entry 946 will remain reasonably visible within inbox 900 if frequent items are generated by the Quickplace application. In the illustrative embodiment, the Quickplace application may execute on the same system as the users Lotus Notes electronic mail client, in accordance with the embodiments described herein.

Manipulation of Conversation Threads

In accordance with the present invention, an electronic mail conversation thread may be handled or processed as a single entity with functions similar to those typically applied to an individual electronic mail message, such as including any of a select, drag and drop, copy, paste, delete, forward, print, move, file, archive, or operation on the data structure representing all ancestor documents in the conversation thread. The conversation thread, that may include a parent/child hierarchy of a plurality of original electronic mail documents, summaries of electronic mail documents, shadow documents of original electronic mail documents, or any combination thereof, may be generated dynamically and the data structure representing the thread forwarded to another electronic mail user. Alternatively, the conversation thread may be generated, but the actual data representing the thread stored in memory as persistent data that can then be manipulated using the known actions such select, drag and drop, copy, paste, delete, forward, etc.

Referring again to FIG. 2, in the illustrative embodiment of the present invention Mail Agent 230 performs the functionality necessary to dynamically generate conversation threads, store the conversation thread representations and forward the same to other electronic mail users. Mail Agent 230 may be implemented as part of Lotus Notes and Domino products from IBM Corporation. The inventive algorithm described herein, however, is not specific to Lotus Notes, Domino and may be implemented using any number of electronic mail systems.

Figure 17C:
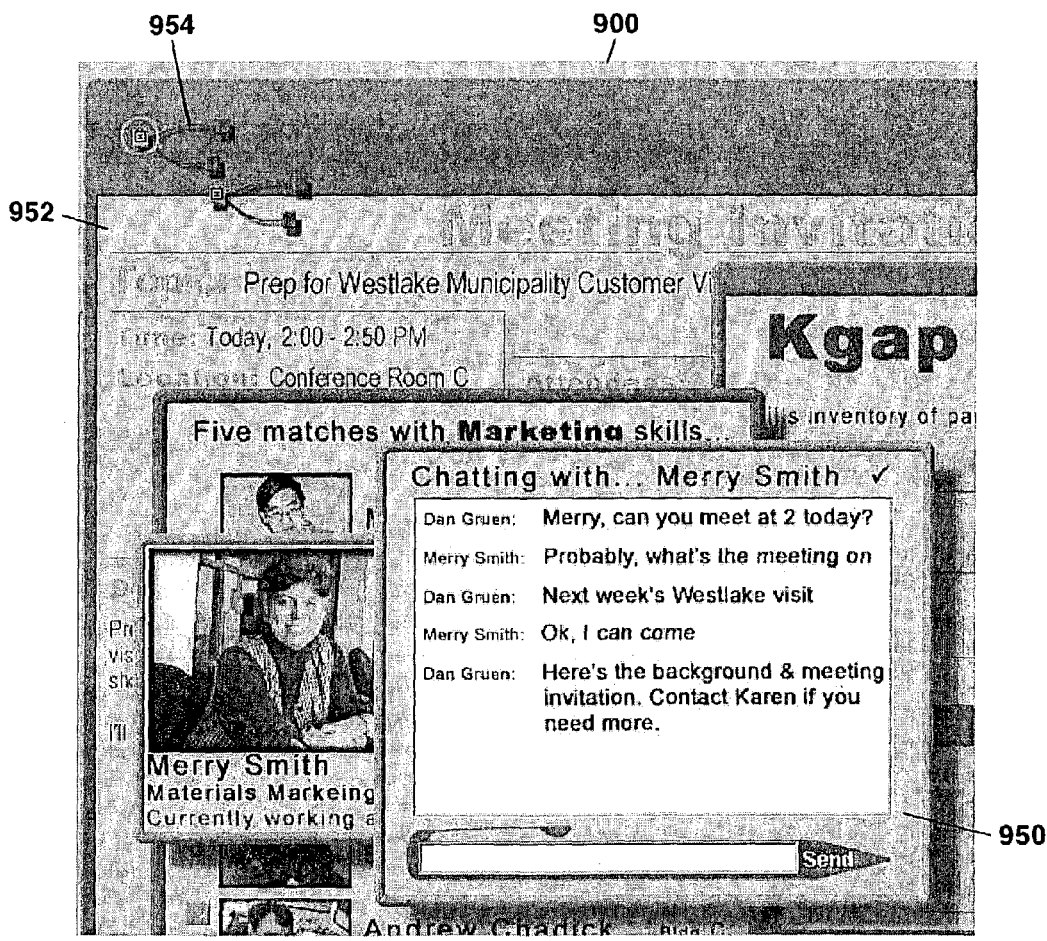
FIG. 17C is a conceptual illustration of the user interface used to forward a conversation thread in accordance with the present invention.
Figure 17A:
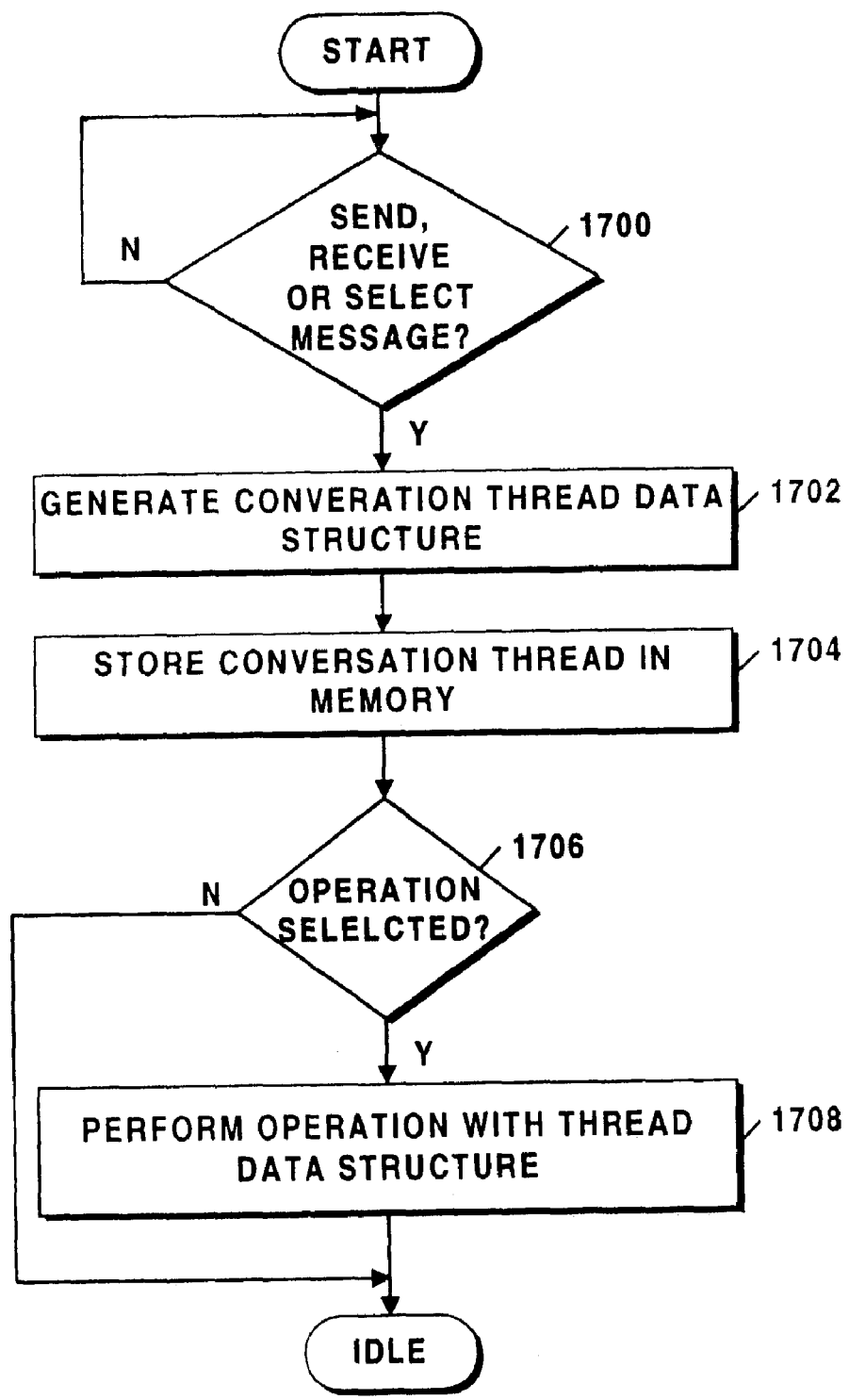
FIG. 17A is a flow chart illustrating the process steps performed during dynamic generation of a conversation thread in accordance with the present invention.

FIG. 17A is a flow chart illustrating the process steps performed by the various components of Mail Agent 230 during the conversation thread generation in accordance with the present invention. Mail Agent 230 utilizes the functionality of shadow document generator 234, parser 233, preprocessing module 265, document summarization module 270, all previously described herein, to perform the conversation thread generation process. First, Mail Agent 230 determines if a new message has been sent or received or if an iconic representation of a conversation thread has been selected from the Notes user interface, as illustrated by decisional step 1700. Next, Mail Agent 230 generates a conversation thread tree, as illustrated by procedural step 1702. The process performed in step 1702 may comprise the algorithm set forth herein with respect to FIGS. 5A-B, in which a shadow document is first generated from an original electronic mail document followed by construction of the conversation thread tree to which the electronic mail document belongs. The end result of the step 1702 is a conversation thread data structure 1720 representing the data for a conversation thread. In an alternative embodiment, the process of generating a conversation thread may comprise only the thread summarization process described with reference to FIGS. 8B-E. In this embodiment, data structure 1720 comprises the summarized content and optional keywords of each document within the thread, all stored in using XML format or other markup language utilizing tags.

Data structure 1720 may be stored in memory, as illustrated by procedural step 1704. Data structure 1720 may be maintained in a Lotus Notes database or other database a persistent data, using XML format or other markup language utilizing tags. The storing of data structure 1720 as persistent data in memory enables the data structure to updated easily. Since data structure 1720 is stored as a persistent object in memory, the electronic mail client, e.g. the Notes client in the illustrative embodiment, views the data structure 1720 similar to any single electronic mail message or document and can perform any of a number of user-defined standard operations, such as any of a select, drag and drop, copy, paste, delete, forward, print, move to another folder, database or storage location, file, archive, or other operation available to a single electronic mail message or document, as illustrated by procedural step 1706. In addition, the data structure 1720 can be represented with a graphic icon on the user interface of the electronic mail utility in a manner understood by those skilled in the arts. Selection of an iconic element representing a thread associated with an electronic mail message from the user interface may trigger dynamic generation of the conversation thread, and, if an operation is identified, immediate performance of a specified operation. For run-time operations, the conversation thread tree may be represented as data structures within the computer memory. Such implementation may be more efficient in an environment where the conversation thread trees can be recomputed quickly relative to storing and retrieving the thread trees from a memory.

Figure 17B:
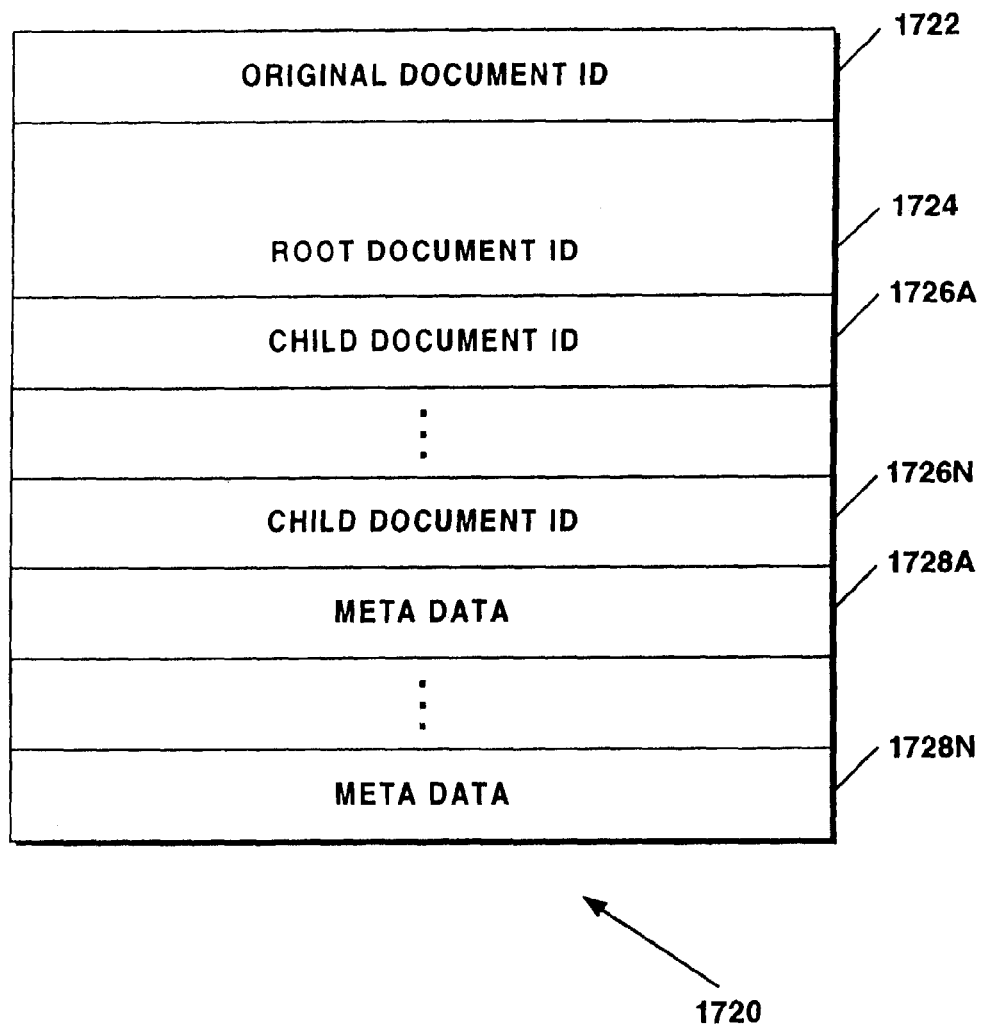
FIG. 17B illustrates the data structures utilized to implement a conversation thread in accordance with an embodiment of the present invention.

FIG. 17B illustrates conceptually the structure and content of data structure 1720 in accordance with the present invention. As shown, conversation thread data structure 1720 comprises an Original Document Identified (ID) 1722, Root Document ID 1724, zero or more Child Document IDs 1726A-N, and Meta Data fields 1728A-N. Original Document ID 1722 may comprise a pointer to the original document, e.g. an electronic mail message. Root Document ID 1724 may comprise a pointer to the root of the conversation thread tree, whether shadow or original. Root Document ID 1724 allows for efficiency in traversing the tree hierarchy. Child Document IDs 1726A-N may comprise a list of pointers to the immediate children documents, whether shadow or original, in the tree hierarchy, if any. In the illustrative embodiment the value of IDs 1722-1728 may be the Notes ID value for a document. Additionally, Meta Data fields 1728A-N may comprise the original content of electronic message documents and/or any attachments thereto or summaries of the original content of the respective documents within the conversation thread, as prepared in accordance with the algorithms set forth with respect to FIGS. 8B-E. In the illustrative embodiment, the meta data may include in addition to summaries of the content of the document and key words, such logistical information as sender, receiver, original size, subject, date, any carbon copy recipients, etc.

In an alternative embodiment, a separate XML document in a database is used to maintain the thread information for multiple conversation threads. With such embodiment, as new messages are received, the respective conversation thread is computed and represented by a tree data structure. The database then contains a list of trees for all of the conversation threads in the database, with each conversation thread represented by a tree. Such in-memory trees can be used to manipulate the entire thread and contain all of the information needed to generate other persistent representation, such as an XML document or separate shadow documents, in memory. It is also contemplated in the present invention that an incomplete tree data structure can still be treated as a single entity, e.g., for forwarding, deleting, copying, pasting, etc.

An exemplary use of a generated thread and manipulation thereof is described hereafter with regard to a meeting invitation. From inbox 900, a user may view an electronic mail message regarding a meeting, including the relevant background information. In the illustrative embodiment, as described herein, selection of the electronic mail causes the relevant thread map to be displayed which includes the original meeting announcement. Selecting the meeting announcement, which may be displayed in a separate window in inbox 900, similar to that shown in item 904 in FIG. 9 causes calendar bar 940 to be displayed, if not already open. Inbox 900, in accordance with the present invention allows the user to accept the meeting invitation through some affirmative action such as selecting an "Accept" button, which may confirm attendance to the other participants with reply electronic mail. In addition, since the thread map containing the original meeting invitation and the subsequent conversation thread is represented in the present invention as a first-class data object, the complete thread in its entirety may be manipulated by the user as a single entity. Specifically, if the user desires to invite an additional participant to the meeting, the meeting thread may be selected from inbox 900 and dragged using a mouse or other pointing device to another potential participant contact reference, such as a name in an address book, an address in another electronic mail, or a party with which a communication such as a video conference or a text chat is currently in progress. The data structure 1720 representing the thread will then be transmitted to the recipient's inbox accordingly. In this manner, the potential participant now has the entire meeting thread, not just the original meeting invitation.

This technique is illustrated by the screen capture of FIG. 17C in which a text chat window 950 is shown displayed with the original meeting invitation 952 and the meeting thread 954 within inbox 900. In the illustrative embodiment, text chat with other electronic mail users may be done with the Sametime or Sametime Connect products commercially available from IBM Corporation. The Sametime product enables a user to determine what other parties are currently online and to perform text chat as well as real time audio/video conferencing with other parties. The Sametime Connect product also enables a user to perform instant messaging between users currently on line. The text chat from a Sametime communication may be transcribed and stored as a document. This document may then be sent as an electronic mail to other non-participants and may likewise be attached as an annotation to a particular document node of a conversation thread tree and its accompanying data structure 1720.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from International Business Machines Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a computer system operatively connectable to a network and capable of executing a communication process for sending and receiving electronic mail documents, a method comprising:
    (A) defining a plurality of categories of electronic mail documents;
    (B) determining, with an automated mail agent and prior to display thereof, that a received electronic mail document is associated with a first one of the plurality of categories of electronic mail documents, wherein the one of the plurality of categories is made up of electronic mail messages that are approval requests requiring an affirmative action by a receiving user, and visually highlighting, in response to a determination that the received electronic mail document is associated with the first one of the plurality of categories, at least a portion of a user interface display object in a graphical user interface, wherein the portion of the user interface display object is labeled with text indicating that at least one approval request has been received;
    (C) receiving selection criteria as to which of the plurality of categories of electronic mail documents are to be displayed, wherein the receiving of the selection criteria includes detecting the receiving user clicking on the portion of the user interface display object labeled with text indicating that at least one approval request has been received; and
    (D) displaying, in response to the receiving of the selection criteria, within a preview section of the graphical user interface, a brief description of and a name of the requester of the received electronic mail document associated with the one of the plurality of categories, and further displaying in response to the receiving of the selection criteria, an approval graphical button that enables the receiving user to approve the approval request by clicking on the approval graphical button.

2. The method of claim 1 wherein (D) comprises:
    (D1) displaying received electronic mail documents associated with the first one of the plurality of categories in a first window region on a user interface while simultaneously displaying received electronic mail documents associated with a second one of the plurality of categories in a second window region on the user interface.

3. The method of claim 2 further comprising:
    (E) presenting graphic representations of the first one of the plurality of categories, the second one of plurality of categories, and a third one of the plurality of categories.

4. The method of claim 3 further comprising:
    (F) presenting a graphic representation of each of the received electronic mail documents associated with a first category, upon selection of the graphic representation of the first category.

5. The method of claim 4 wherein (F) comprises:
    (F1) displaying one of the received electronic mail document and a surrogate document derived from the received electronic mail document upon selection of the graphic representation of one of the received electronic mail documents associated with the first one of the plurality of categories.

6. The method of claim 1 wherein each of the plurality of categories of electronic mail documents has an identifying characteristic associated therewith.

7. The method of claim 6 wherein (B) further comprises:
    (B1) determining if the received electronic mail document contains an identifying characteristic associated with the first one of the plurality of categories.

8. The method of claim 6, further comprising detecting, from the receiving user, a user selection through the graphical user interface, the user selection selecting at least one of the plurality of categories, wherein the plurality of categories consists of approvals, newsletters, office memos, and press releases.

9. The method of claim 8 further comprising displaying, in response to the receiving of the selection criteria, within a preview section of the graphical user interface, a details graphical button that enables the receiving user to view, by clicking on the details graphical button, in a separate display window, a greater portion of the received electronic mail document than is displayed in the brief description.

10. The method of claim 9, further comprising visually displaying, responsive to the determining that the received electronic mail document is associated with the first one of the plurality of categories of electronic mail documents, a current count of the number of approval requests that have been received.

11. The method of claim 10, further comprising:
    detecting the receiving user clicking on the approval graphical button; and
    in response to the detecting of the receiving user clicking on the approval graphical button, sending a user definable approval notification message to the requester, deleting the electronic mail document, and decrementing the current count of the number of approval requests that have been received.

12. A computer readable medium comprising instructions which, when executed by a computer processing system, cause the system to perform a method comprising:
    defining a plurality of categories of electronic mail documents;
    determining, by an automated mail agent, a first one of the plurality of categories that a received electronic mail document is associated with, wherein the first one of the plurality of categories is made up of electronic mail messages that are approval requests requiring an affirmative action by a receiving user, and visually highlighting, in response to a determination that the received electronic mail document is associated with the first one of the plurality of categories, at least a portion of a user interface display object in a graphical user interface, wherein the portion of the user interface display object is labeled with text indicating that at least one approval request has been received;

receiving selection criteria as to which of the plurality of categories of electronic mail documents are to be displayed, wherein the receiving of the selection criteria includes detecting the receiving user clicking on the portion of the user interface display object labeled with text indicating that at least one approval request has been received; and displaying, in response to the receiving of the selection criteria, within a preview section of the graphical user interface, a brief description of and a name of the requester of the received electronic mail document associated with the first one of the plurality of categories, and further displaying in response to the receiving of the selection criteria, an approval graphical button that enables the receiving user to approve the approval request by clicking on the approval graphical button; and displaying received electronic mail documents associated with a the first one of the plurality of categories in a first window region on a user interface while simultaneously displaying received electronic mail documents associated with a second one of the plurality of categories in a second window region on the user interface.

13. An apparatus for use with a computer system operatively connectable to a network and capable of executing a communication process for sending and receiving electronic mail documents, the apparatus comprising:

(A) program logic for defining a plurality of categories of electronic mail documents;

(B) program logic for determining with an automated mail agent a first one of the plurality of categories that a received electronic mail document is associated with, wherein the one of the plurality of categories is made up of electronic mail messages that are approval requests requiring an affirmative action by a receiving user, and visually highlighting, in response to a determination that the received electronic mail document is associated with the first one of the plurality of categories, at least a portion of a user interface display object in a graphical user interface, wherein the portion of the user interface display object is labeled with text indicating that at least one approval request has been received;

(C) a memory for storing received electronic mail documents, (D) program logic for storing a received electronic mail document in the memory in accordance with which of the plurality of categories the received electronic mail document is associated;

(E) program logic for receiving selection criteria as to which of the plurality of categories of electronic mail documents are to be displayed, wherein the receiving of the selection criteria includes detecting the receiving user clicking on the portion of the user interface display object labeled with text indicating that at least one approval request has been received, for displaying, in response to the receiving of the selection criteria, within a preview section of the graphical user interface, a brief description of and a name of the requester of the received electronic mail document associated with the first one of the plurality of categories, and further displaying in response to the receiving of the selection criteria, an approval graphical button that enables the receiving user to approve the approval request by clicking on the approval graphical button.

14. The apparatus of claim 13 further comprising:

(F) program logic for presenting a graphic representation of each of the received electronic mail documents within the first one of the plurality of categories.

15. The apparatus of claim 14 further comprising:

(G) program logic for displaying one of the received electronic mail document and a surrogate document derived from the received electronic mail document upon selection of the graphic representation of said one received electronic mail document.

* * * * *